United States Patent
Zhao et al.

(10) Patent No.: US 10,430,364 B2
(45) Date of Patent: Oct. 1, 2019

(54) PACKET FORWARDING

(71) Applicant: NEW H3C TECHNOLOGIES CO., LTD., Hangzhou (CN)

(72) Inventors: Zhiyu Zhao, Beijing (CN); Changlin Mu, Beijing (CN); Yanfeng Zuo, Beijing (CN)

(73) Assignee: New H3C Technologies Co., Ltd., Hangzhou (CN)

(*) Notice: Subject to any disclaimer, the term of this patent is extended or adjusted under 35 U.S.C. 154(b) by 28 days.

(21) Appl. No.: 15/771,963

(22) PCT Filed: Oct. 31, 2016

(86) PCT No.: PCT/CN2016/103943
§ 371 (c)(1),
(2) Date: Apr. 27, 2018

(87) PCT Pub. No.: WO2017/071667
PCT Pub. Date: May 4, 2017

(65) Prior Publication Data
US 2018/0225247 A1 Aug. 9, 2018

(30) Foreign Application Priority Data
Oct. 30, 2015 (CN) .......................... 2015 1 0721081

(51) Int. Cl.
G06F 13/40 (2006.01)
G06F 13/42 (2006.01)
(Continued)

(52) U.S. Cl.
CPC ...... G06F 13/4027 (2013.01); G06F 13/4282 (2013.01); H04L 45/74 (2013.01);
(Continued)

(58) Field of Classification Search
CPC ......... G06F 13/4027; G06F 2213/0026; G06F 13/4282; H04L 45/74
See application file for complete search history.

(56) References Cited

U.S. PATENT DOCUMENTS 5,566,170 A * 10/1996 Bakke ..................... H04L 29/06
370/392
7,830,882 B2 * 11/2010 Johnson ................ G06F 13/387
370/392
(Continued)

FOREIGN PATENT DOCUMENTS

CN 101277195 A 10/2008
CN 102393838 A 3/2012
(Continued)

OTHER PUBLICATIONS

Japanese Patent Office, Office Action Issued in Application No. 2018-521989, dated May 14, 2019, 4 pages. (Submitted with Machine Translation).
(Continued)

Primary Examiner — Henry Tsai
Assistant Examiner — Christopher Daley
(74) Attorney, Agent, or Firm — McCoy Russell LLP

(57) ABSTRACT

When a first interface board receives from an Ethernet switch chip a first Ethernet data packet, once a destination board of the data packet is determined as second interface board logical device of the first interface board encapsulates the data packet into a PCI-E packet that takes a PCI-E memory space address of a board memory in the second interface board as a destination address, so as to enable a PCI-E Endpoint to forward the first PCI-E packet to a forwarding board of a network device; when the first interface board obtains from a board memory a second PCI-E packet coming from a third interface board, logical device of the first interface board parses out a Ethernet data packet
(Continued)

from the second PCI-E packet, and transmits the data packet to the Ethernet switch chip, the third interface board and second interface board being the same or not same.

15 Claims, 21 Drawing Sheets

(51) Int. Cl.
*H04L 12/741* (2013.01)
*H04L 12/931* (2013.01)

(52) U.S. Cl.
CPC .... *H04L 49/351* (2013.01); *G06F 2213/0026* (2013.01); *H04L 49/70* (2013.01)

(56) References Cited

U.S. PATENT DOCUMENTS

| | | | | |
|---|---|---|---|---|
| 8,661,178 | B2* | 2/2014 | Richard | G06F 13/4022 |
| | | | | 710/104 |
| 9,178,815 | B2* | 11/2015 | Gasparakis | H04L 45/74 |
| 9,244,874 | B2* | 1/2016 | Hearn | G06F 13/4045 |
| 9,306,849 | B2* | 4/2016 | Tripathi | H04L 45/66 |
| 9,329,783 | B2* | 5/2016 | He | G06F 3/0655 |
| 9,424,892 | B2* | 8/2016 | Haneda | G11C 7/10 |
| 9,753,883 | B2* | 9/2017 | Stark | G06F 13/4234 |
| 9,886,410 | B1* | 2/2018 | Davis | G06F 13/4221 |
| 10,073,805 | B2* | 9/2018 | Vishwanathan | G06F 13/4282 |
| 2008/0117909 | A1 | 5/2008 | Johnson | |
| 2010/0115174 | A1 | 5/2010 | Akyol et al. | |
| 2013/0031288 | A1 | 1/2013 | Richard | |
| 2015/0006780 | A1* | 1/2015 | Shao | G06F 13/4022 |
| | | | | 710/316 |
| 2015/0067229 | A1 | 3/2015 | Connor et al. | |
| 2018/0011812 | A1* | 1/2018 | Morishita | G06F 12/0215 |

FOREIGN PATENT DOCUMENTS

| | | |
|---|---|---|
| CN | 103490961 A | 1/2014 |
| JP | 2012078895 A | 4/2012 |
| JP | 2013088879 A | 5/2013 |
| JP | 2015146488 A | 8/2015 |
| WO | 2013157256 A1 | 10/2013 |

OTHER PUBLICATIONS

European Patent Office, Extended European Search Report Issued in Application No. 16859102.2, dated Oct. 5, 2018, Germany, 5 pages.
ISA State Intellectual Property Office of the People's Republic of China, Written Opinion of the the International Searching Authority Issued in Application No. PCT/CN2016/103943, dated Jan. 13, 2017, WIPO, 6 pages.
State Intellectual Property Office of the People's Republic of China, Office Action and Search Report Issued in Application No. 201510721081.9, dated Apr. 1, 2019, 9 pages. (Submitted with Partial Translation).
ISA State Intellectual Property Office of the People's Republic of China, International Search Report Issued in Application No. PCT/CN2016/103943, dated Jan. 13, 2017, WIPO, 4 pages.

* cited by examiner

PACKET FORWARDING

CROSS-REFERENCE TO RELATED APPLICATIONS

The present application is a U.S. National Phase of International Patent Application Serial No. PCT/CN2016/103943 entitled "PACKET FORWARDING," filed on Oct. 31, 2016. International Patent Application Serial No. PCT/CN2016/103943 claims priority to Chinese Patent Application No. 201510721081.9, filed on Oct. 30, 2015. The entire contents of each of the above-cited applications are hereby incorporated by reference in their entirety for all purposes.

BACKGROUND

A network device may include a forwarding board and at least two interface boards. The forwarding board is one board, which takes charge of forwarding and processing network packets. The interface board possesses an out interface of a physical network, which is in charge of transmitting and receiving network packets. Besides, a forwarding board may be connected with each interface board, by using a Peripheral Component Interconnect Express (PCI-E) bus.

When interconnecting the forwarding board with the interface board by using the PCI-E bus, how to improve forwarding performance among different interface boards, and reduce occupancy rate of centrol processing unit (CPU) in a forwarding board may be taken into account.

BRIEF DESCRIPTIONS OF THE DRAWINGS

DETAILED DESCRIPTIONS

Figure 1:
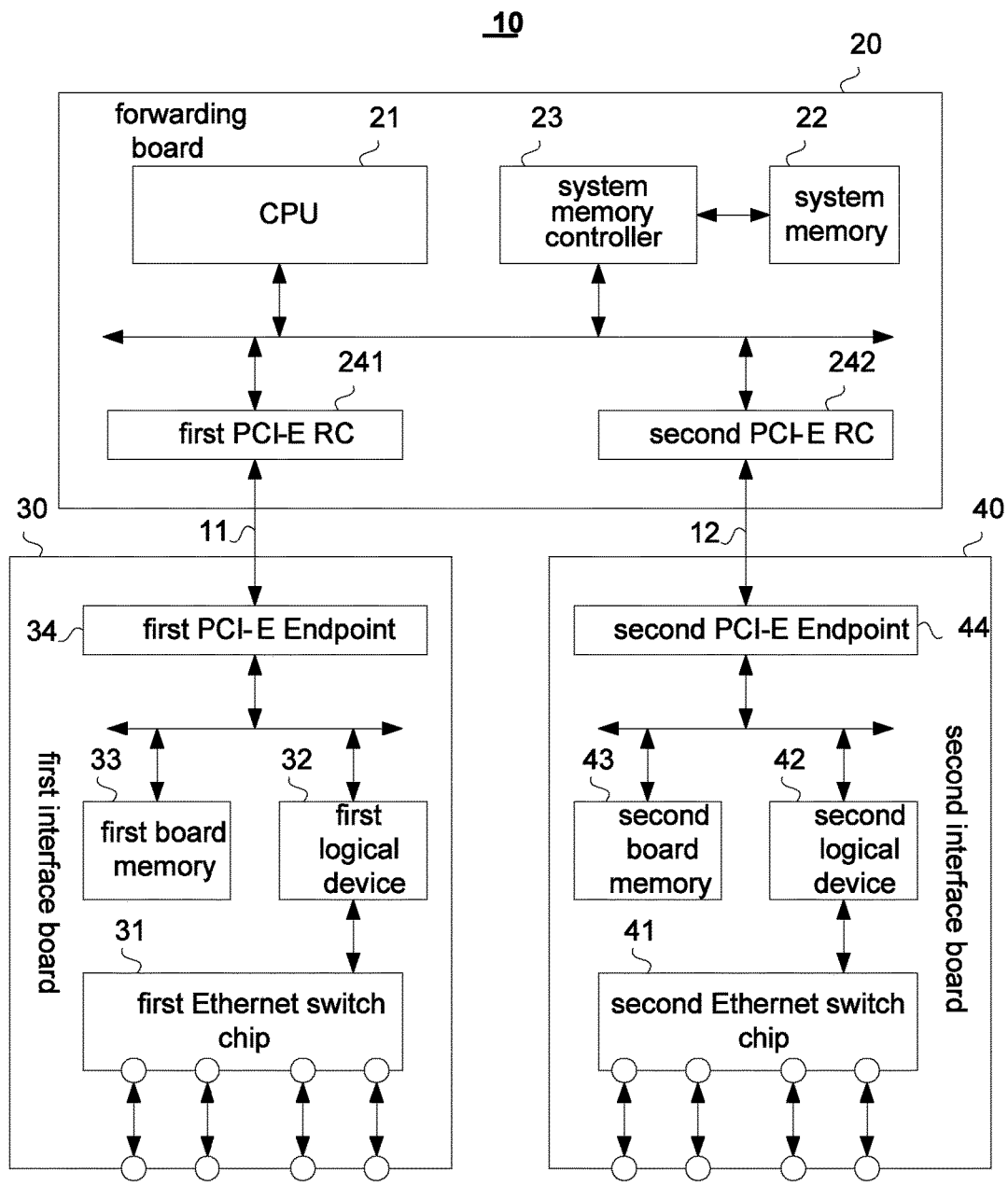
FIG. 1 is a schematic diagram illustrating structure of a network device, in accordance with an example of the present disclosure.

Please refer to FIG. 1, in an example, a network device 10 may include a forwarding board 20, a first interface board 30 and a second interface board 40.

The forwarding board 20 may include a CPU 21, a system memory 22, a system memory controller 23, a first PCI-E root complex (RC) 241 and a second PCI-E RC 242. The CPU 21, the system memory controller 23, the first PCI-E RC 241 and the second PCI-E RC 242 are connected with each other. Besides, the system memory 22 is connected with the system memory controller 23.

In an example, the CPU 21, the system memory controller 23, the first PCI-E RC 241 and the second PCI-E RC 242 of the forwarding board may be integrated into a system-on-a-chip (SOC) CPU. In another example, the system memory controller 23 of the forwarding board may be integrated into the CPU 21. Besides, the first PCI-E RC 241 and the second PCI-E RC 242 of the forwarding board may be integrated into a platform controller hub (PCH) independent of the CPU 21.

Besides, the first PCI-E RC 241 and the second PCI-E RC 242 in FIG. 1 are independent of each other, which does not mean that the first PCI-E RC 241 and the second PCI-E RC 242 are two independent entities definitely. That is, the first PCI-E RC 241 and second PCI-E RC 242 in FIG. 1 may be two equivalent PCI-E RCs, which are formed logically, by connecting an entity possessing functions of PCI-E RC to a PCI-E Switch externally. Besides, when the first PCI-E RC 241 and the second PCI-E RC 242 are two independent entities, either of the first PCI-E RC 241 and the second PCI-E RC 242 may be connected with the PCI-E switch externally.

The first interface board 30 may include a first Ethernet switch chip 31, a first logical device 32, a first board memory 33, and a first PCI-E Endpoint 34 connecting with the first PCI-E RC 241 via a first PCI-E bus 11. The first Ethernet switch chip 31 and the first logical device 32 may be connected with each other (e.g., via an Ethernet bus). Besides, the first logical device 32, the first board memory 33 and the first PCI-E Endpoint 34 may be connected with each other.

The second interface board 40 may include a second Ethernet switch chip 41, a second logical device 42, a second board memory 43, and a second PCI-E Enpoint 44 connecting with the second PCI-E RC 242 via a second PCI-E bus 12. The second Ethernet switch chip 41 and the second logical device 42 may be connected with each other (e.g., via the Ethernet bus). Besides, the second logical device 42, the second board memory 43 and the second PCI-E Endpoint 44 may be connected with each other.

Figure 2:
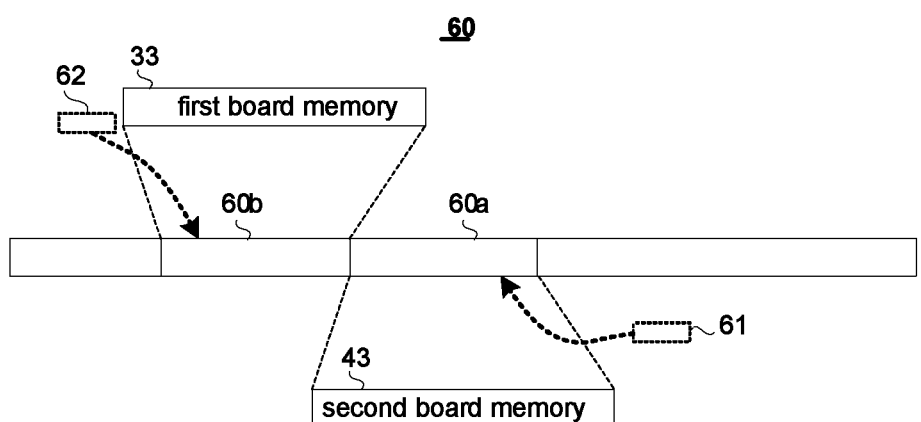
FIG. 2 is a schematic diagram illustrating mapping to PCI-E memory space, which is in the network device shown in FIG. 1.

Please refer to FIG. 2, in a network device 10, a first board memory 33 and a second board memory 43 both map to PCI-E memory space 60 of the network device 10. Besides, an address range 60*b* in the PCI-E memory space 60 mapped by the first board memory 33 may be different from an address range 60*a*, which is also in the PCI-E memory space 60 mapped by the second board memory 43. Thus, for the first PCI-E RC 241, the second PCI-E RC 242, the first PCI-E Endpoint 34 and the second PCI-E Endpoint 44, the first board memory 33 and the second board memory 43 are not transparent.

Figure 3A:
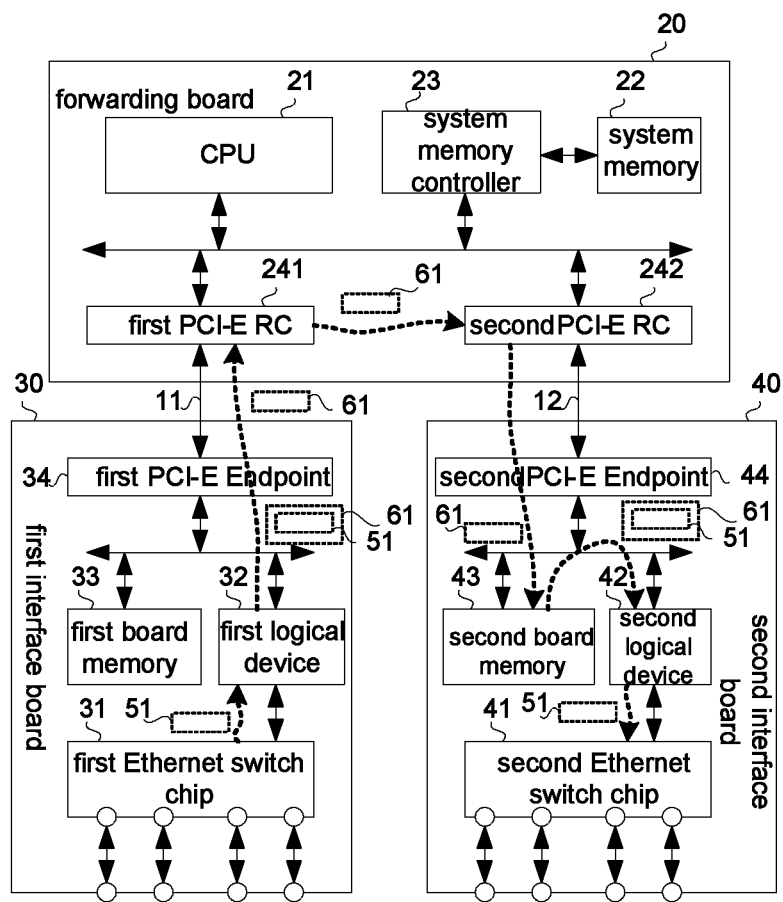
FIG. 3A is a schematic diagram illustrating a principle for forwarding a packet, which is mapped by the PCI-E memory space shown in FIG. 2.

Please refer to FIG. 3A and take into account FIG. 2, for a case where forwarding is performed from the first interface board 30 to the second interface board 40:

When the first logical device 32 in the first interface board 30 receives an Ethernet data packet 51 from the first Ethernet switch chip 31, the first logical device 32 may determine the destination board of the Ethernet data packet 51. The Ethernet data packet 51 may be received from an exterior of the network device 10, by using the first Ethernet switch chip 31. The first logical device 32 may determine the destination board of the Ethernet data packet 51, based on a maintained a mapping table between an Ethernet media access control (MAC) address and a board identity (ID).

For example, no matter the destination board of the Ethernet data packet 51 is the second interface board 40 or the forwarding board 20, the Ethernet data packet 51 may be forwarded to the system memory 22 of the forwarding board 20 in PCI-E format, and then be read by the CPU 21 from the system memory 22 to be processed.

In the example, when determining that the destination board of the Ethernet data packet 51 received from the first Ethernet switch chip 31 is the second interface board 40, the first logical device 32 may encapsulate the Ethernet data packet 51 into a PCI-E packet 61 (a PCI-E write packet in the application may be referred to as "the PCI-E packet" for short), which takes the PCI-E memory space address (that is, address within the address range 60*a* in FIG. 2) of the second board memory 43 as the destination address, such that the first PCI-E Endpoint 34 may forward the PCI-E packet 61 to the forwarding board 20, and enable the forwarding board 20 to forward the PCI-E packet 61 to the second board memory 43 of the second interface board 40, which is taken as the destination board, by using the destination address of the PCI-E packet 61. For example, the first PCI-E Endpoint 34 may transmit the PCI-E packet 61 to the first PCI-E RC 241. And then, the first PCI-E RC 241 may forward the PCI-E packet 61 to the second PCI-E RC 242, based on the destination address of the PCI-E packet 61. The PCI-E packet 61 encapsulated with the Ethernet data packet 51 may be forwarded to the second PCI-E Endpoint 44 by the second PCI-E RC 242, and may be written into the second board memory 43 by the second PCI-E Endpoint 44.

Correspondingly, the second logical device 42 may obtain the PCI-E packet 61 from the second board memory 43, analyze the Ethernet data packet 51 from the PCI-E packet 61, and transmit the Ethernet data packet 51 to the second Ethernet switch chip 41, such that the second Ethernet switch chip 41 may transmit the Ethernet data packet 51 to the exterior of the network device 10.

Figure 3B:
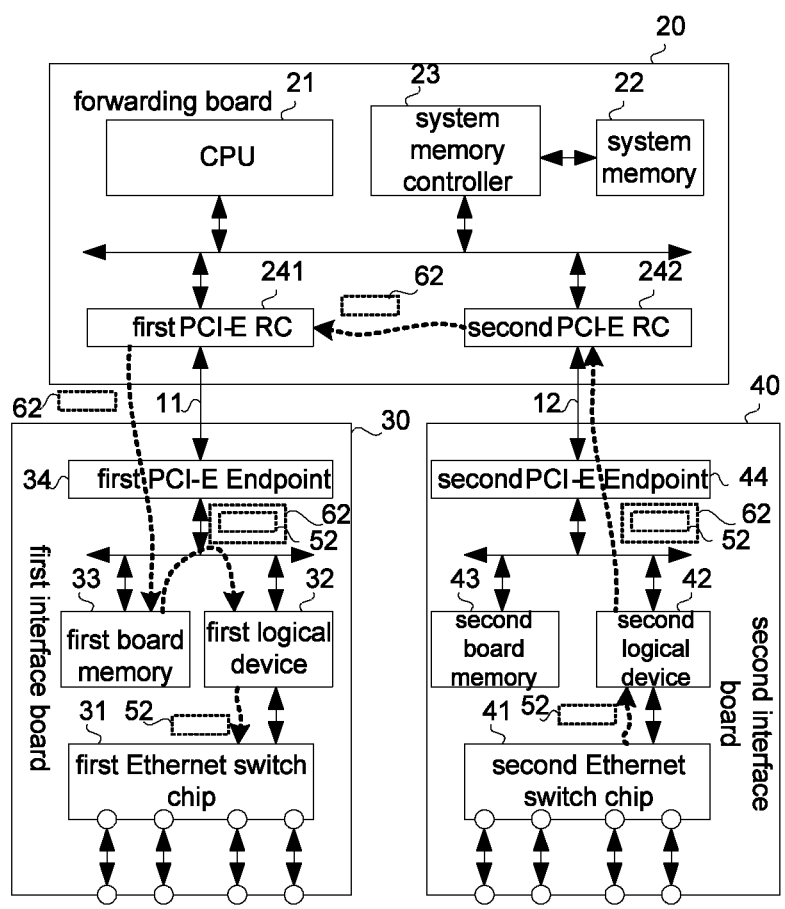
FIG. 3B is a schematic diagram illustrating a principle for forwarding a packet, which is mapped by the PCI-E memory space shown in FIG. 2

Please refer to FIG. 3B and take into account FIG. 2, similar to the forwarding from the first interface board 30 to the second interface board 40, in a case where forwarding is performed from the second interface board 40 to the first interface board 30:

when the second logical device 42 of the second interface board 40 receives an Ethernet data packet 52 from the second Ethernet switch chip 41, the second logical device 42 may determine the destination board of the Ethernet data packet 52. The Ethernet data packet 52 may be received from the exterior of the network device 10, by using the second Ethernet switch chip 41.

When determining that the destination board of the Ethernet data packet 52 received from the second Ethernet switch chip 41 is the first interface board 30, the second logical device 42 may encapsulate the Ethernet data packet 52 into a PCI-E packet 62, which takes the PCI-E memory space address (that is, address within address range 60*b* in FIG. 2) of the first board memory 33 as the destination address, such that the second PCI-E Endpoint 44 may forward the PCI-E packet 62 to the forwarding board 20, and enable the forwarding board 20 to forward the PCI-E packet 62 to the first board memory 33 of the first interface board 30, which is taken as the destination board, by using the destination address of the PCI-E packet 62. For example, the second PCI-E Endpoint 44 may transmit the PCI-E packet 62 to the second PCI-E RC 242. And then, the second PCI-E RC 242 may forward the PCI-E packet 62 to the first PCI-E RC 241, based on the destination address of the PCI-E packet 62. The PCI-E packet 62 encapsulated with the Ethernet data packet 52 may be forwarded by the first PCI-E RC 241 to the first PCI-E Endpoint 34, and then be written by the first PCI-E Endpoint 34 into the first board memory 33.

Correspondingly, the first logical device 32 may obtain the PCI-E packet 62 from the first board memory 33, analyze the Ethernet data packet 52 from the PCI-E packet 62, and forward the Ethernet data packet 52 to the first Ethernet switch chip 31, such that the first Ethernet switch chip 31 may transmit the Ethernet data packet 52 to the exterior of the network device 10.

Based on the foregoing contents, it can be seen that it is not necessary for the CPU 21 of the forwarding board 20 to participate in the forwarding of the Ethernet data packet 51 or 52, which is between the first interface board 30 and the second interface board 40. Besides, forwarding performance of the Ethernet data packet 51 or 52 between the first interface board 30 and the second interface board 40 may be improved to some extent.

Figure 4:
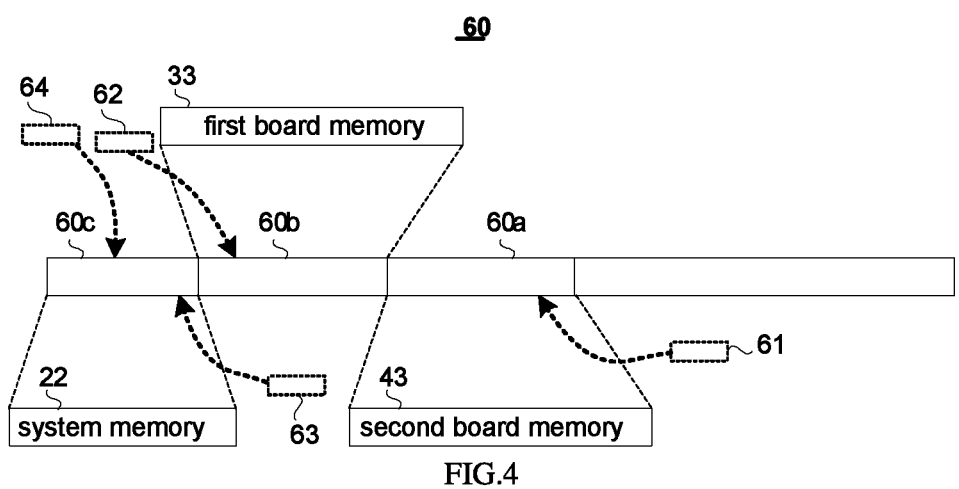
FIG. 4 is a schematic diagram illustrating extension mapping of PCI-E memory space, which is in the network device shown in FIG. 1.

Besides, please refer to FIG. 4, the system memory 22 of the forwarding board 20 may be mapped to the PCI-E memory space 60 of the network device 10. That is, for the first PCI-E RC 241, the second PCI-E RC 242, the first PCI-E Endpoint 34 and the second PCI-E Endpoint 44, the memory space 60 is not transparent. Besides, an address range 60*c* in the PCI-E memory space mapped by the system memory 22 may be different from address range 60*b* and address range 60*a*. The address range 60*b* is in the PCI-E memory space 60, which is mapped by the first board memory 33. The address range 60a is also in the PCI-E memory space 60, which is mapped by the second board memory 43. The system memory 22, which may refer to all the memory space or some memory space of the system memory 22, may be mapped to the PCI-E memory space 60.

Figure 5A:
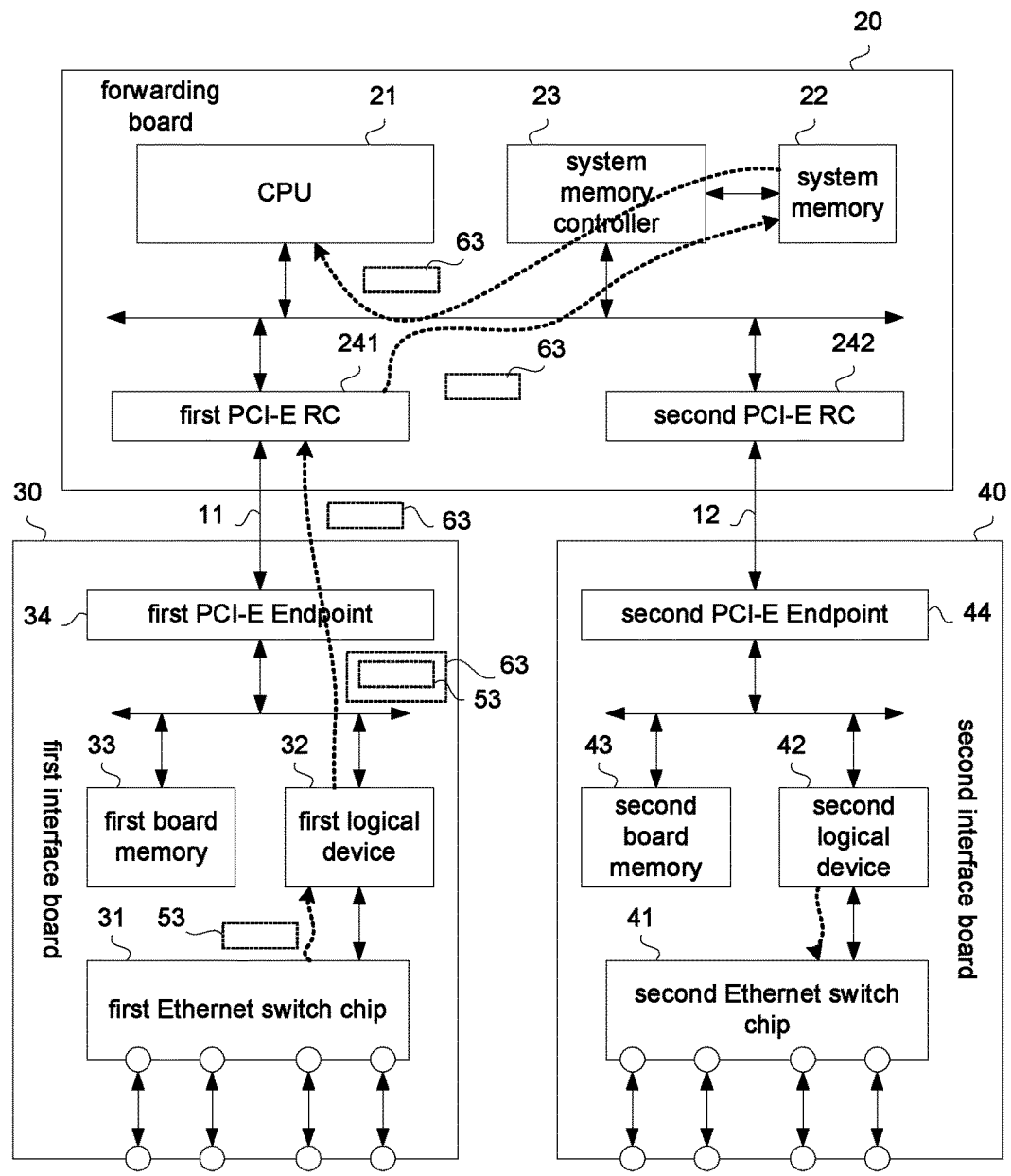
FIG. 5A is a schematic diagram illustrating a principle for forwarding a packet, which is mapped by the PCI-E memory space shown in FIG. 4.

Please refer to FIG. 5A and take into account FIG. 4, in a case where forwarding is performed from the first interface board 30 to the forwarding board 20:

when the first logical device 32 of the first interface board 30 receives an Ethernet data packet 53 from the first Ethernet switch chip 31, the first logical device 32 may determine the destination board of the Ethernet data packet 53. For example, the first logical device 32 may determine the destination board of the Ethernet data packet 53, based on an entry in a mapping table between an Ethernet MAC address and a board ID, which is configured by the CPU 21 of the forwarding board 20.

When determining that the destination board of the Ethernet data packet 53 received from the first Ethernet switch chip 31 is the forwarding board 20, the first logical device 32 may encapsulate the Ethernet data packet 53 into a PCI-E packet 63, which takes the PCI-E memory space address (that is, address within address range 60c in FIG. 4) of system memory 22 as the destination address, such that the first PCI-E Endpoint 34 may transmit the PCI-E packet 63 to the first PCI-E RC 241. And then, the first PCI-E RC 241 may write the PCI-E packet 63 into the system memory 22, based on the destination address of the PCI-E packet 63. Thus, after accessing the system memory 22 by the system memory controller 23, the CPU 21 may read the PCI-E packet 63, and analyze the Ethernet data packet 53 from the PCI-E packet 63.

Figure 5B:
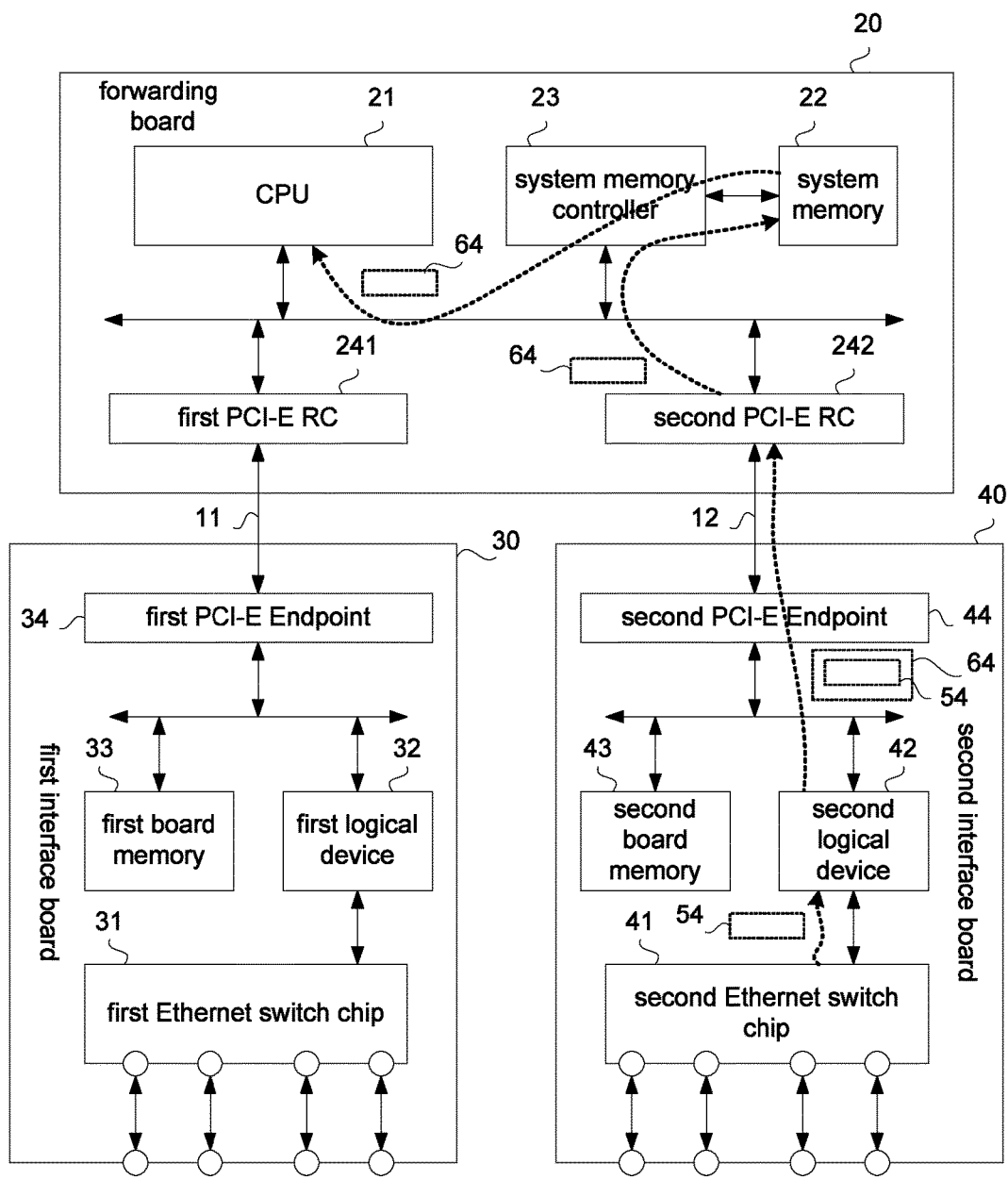
FIG. 5B is a schematic diagram illustrating a principle for forwarding a packet, which is mapped by the PCI-E memory space shown in FIG. 4.

Please refer to FIG. 5B and take into account FIG. 4, similar to the forwarding from the first interface board 30 to the forwarding board 20, in a case where forwarding is performed from the second interface board 40 to the forwarding board 20.

When the second logical device 42 of the second interface board 40 receives an Ethernet data packet 54 from the second Ethernet switch chip 41, the second logical device 42 may determine the destination board of the Ethernet data packet 54.

When determining that the destination board of the Ethernet data packet 54 received from the second Ethernet switch chip 41 is the forwarding board 20, the second logical device 42 may encapsulate the Ethernet data packet 54 into a PCI-E packet 64, which takes the PCI-E memory space address (that is, address within address range 60c in FIG. 4) of system memory 22 as the destination address, such that the second PCI-E Endpoint 44 may transmit the PCI-E packet 64 to the second PCI-E RC 242. And then, the second PCI-E RC 242 may write the PCI-E packet 64 into the system memory 22, based on the destination address of the PCI-E packet 64. Thus, when accessing the system memory 22 by the system memory controller 23, the CPU 21 may read the PCI-E packet 64, and analyze the Ethernet data packet 54 from the PCI-E packet 64.

Based on foregoing contents, it can be seen that the forwarding between the first interface board 30 and the forwarding board 20 will not be affected, by using the forwarding between the first interface board 30 and the second interface board 40 in the example. The forwarding between the second interface board 40 and the forwarding board 20 is also in the similar case.

Figure 6A:
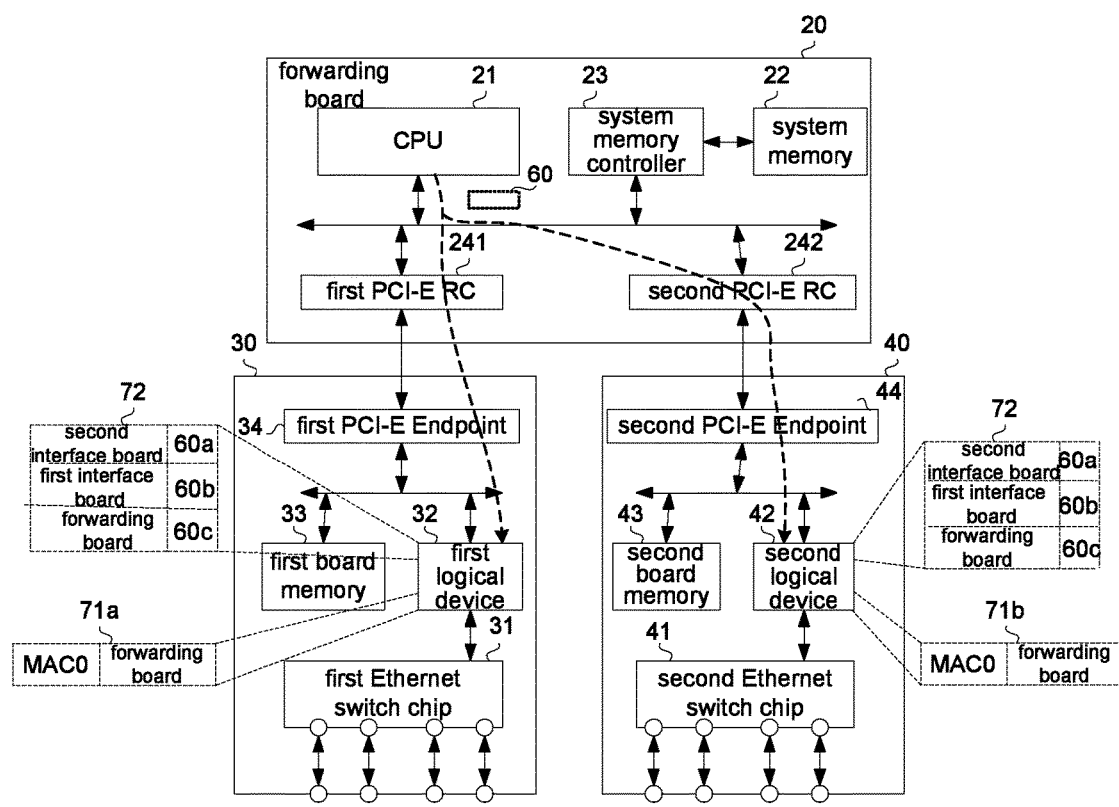
FIG. 6A is a schematic diagram illustrating configurations for an entry, which is in the network device shown in FIG. 1.
Figure 6B:
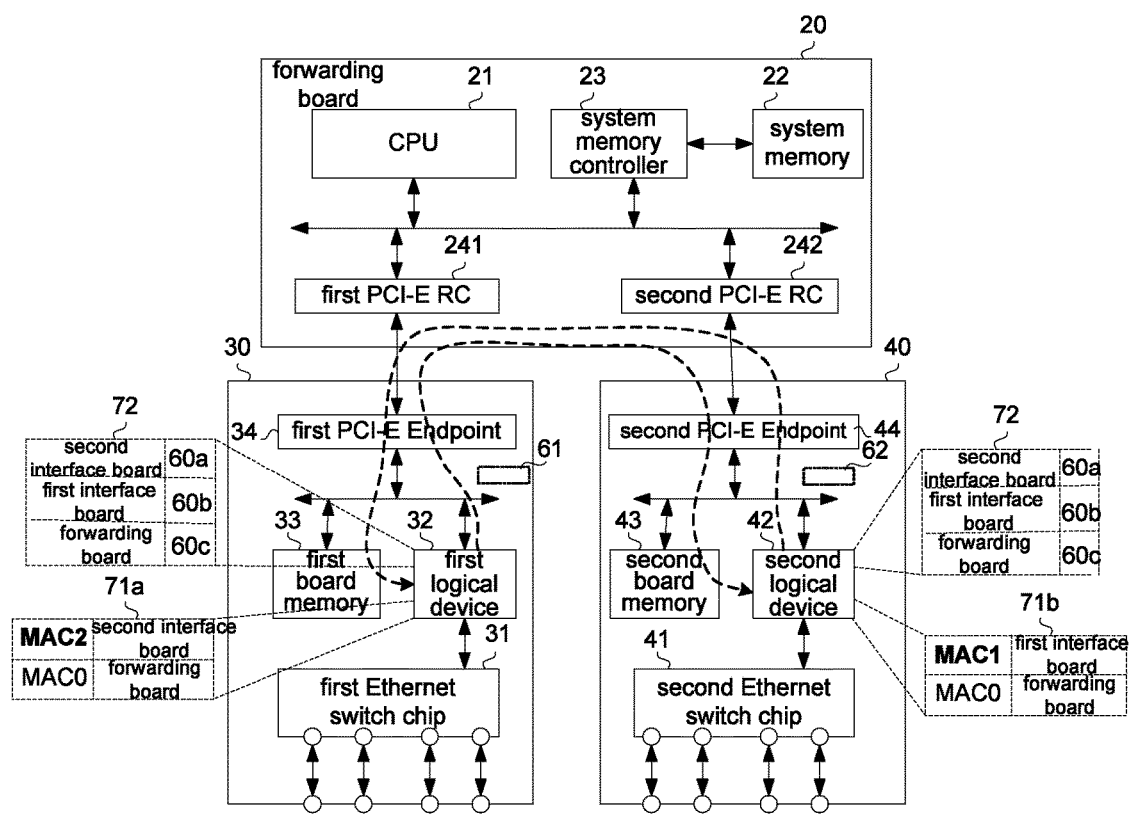
FIG. 6B is a schematic diagram illustrating configurations for an entry, which is in the network device shown in FIG. 1.

Please refer to FIG. 6A and FIG. 6B, the first logical device 32 may maintain a mapping table 71a, which is between an Ethernet MAC address and a board ID. The second logical device 42 may maintain a mapping table 71b, which is between an Ethernet MAC address and a board ID. Subsequently, the first logical device 32 and the second logical device 42 may determine the destination board of Ethernet data packet 51, or 52, or 53, or 54, based on the destination MAC address of the Ethernet data packet 51, or 52, or 53, or 54.

Still refer to FIG. 6A and FIG. 6B, the first logical device 32 and the second logical device 42 may also maintain a mapping table 72, which is between a board ID and a PCI-E memory space address, so as to determine the destination address of PCI-E packet 61, or 62, or 63, or 64 encapsulated with the Ethernet data packet 51, or 52, or 53, or 54, based on the destination board of the Ethernet data packet 51, or 52, or 53, or 54.

FIG. 6A illustrates the states of mapping tables 71a, 71b and 72, after initializing the network device 10. As shown in FIG. 6A, entries in the mapping tables 71a and 71b corresponding to the forwarding board 20, and all the entries in the mapping table 72 may be issued by the CPU 21, by using the PCI-E packet 60, when initializing the network device 10. "MAC0" shown in FIG. 6A and FIG. 6B represents the MAC address of the forwarding board 20.

In the example, the PCI-E packet 60 for issuing an entry by the CPU 21 may be forwarded, by using the first PCI-E bus 11 and the second PCI-E bus 12. That is, the CPU 21 may reuse the first PCI-E bus 11 and the second PCI-E bus 12 to be a management bus, which is configured to issue an entry. It may be understood that, the management bus dedicated for issuing an entry, which is independent of the first PCI-E bus 11 and the second PCI-E bus 12, may be set within the network device 10. At this time, the issued entry may be carried by a protocol packet of an independent management bus.

In addition, as shown in FIG. 6B, the entry in the mapping table 71a corresponding to the second interface board 40 may be learn by the first logical device 32 from the Ethernet data packet 52, which is encapsulated into the PCI-E packet 62 coming from the second interface board 40. "MAC2" in FIG. 6B may represent the source MAC address of the Ethernet data packet 52.

Similarly, as shown in FIG. 6B, the entry in the mapping table 71b corresponding to the first interface board 30 may be learned by the second logical device 42 from the Ethernet data packet 51, which is encapsulated into the PCI-E packet 61 coming from the first interface board 30. "MAC1" in FIG. 6B may represent the source MAC address of the Ethernet data packet 51.

When the PCI-E packet 62 encapsulated by the second logical device 42 is written into the first board memory 33, the first logical device 32 may obtain the PCI-E packet 62 from the first board memory 33. The PCI-E packet 62 may be encapsulated with the Ethernet data packet 52, which is received by the second logical device 42 through the second Ethernet switch chip 41. The PCI-E packet 62 may further carry the board ID of the second interface board 40. Besides, at this time, when the mapping table 71a does not include an entry corresponding to the second interface board 40, the first logical device 32 may create an entry corresponding to the second interface board 40 in the mapping table 71a, based on the source MAC address of the Ethernet data packet 52 analyzed from the PCI-E packet 62 and the board ID carried by the PCI-E packet 62.

Similarly, when the PCI-E packet 61 encapsulated by the first logical device 32 is written into the second board memory 43, the second logical device 42 may obtain the PCI-E packet 61 from the second board memory 43. The PCI-E packet 61 may be encapsulated with the Ethernet data packet 51, which is received by the first logical device 32 from the first Ethernet switch chip 31. The PCI-E packet 61 may further carry the board ID of the first interface board 30. Besides, at this time, when there is no entry corresponding to the first interface board 30 in the mapping table 71*b*, the second logical device 42 may create an entry corresponding to the first interface board 30 in the mapping table 71*b*, based on the source MAC address of the Ethernet data packet 51 analyzed from the PCI-E packet 61 and the board ID carried by the PCI-E packet 61.

The first logical device 32 or the second logical device 42 may not search out a destination board of an Ethernet data packet, based on the mapping table between an Ethernet MAC address and a board ID.

For example, when the Ethernet data packet 51 is a boardcast packet, since the destination MAC address of the Ethernet data packet 51 is a broadcast address, the destination board of the Ethernet data packet 51 may not be determined, by using the mapping table between the Ethernet MAC address and board ID. Subsequently, query the destination board for the Ethernet data packet 51 may be failed.

At this time, the PCI-E packet may be forwarded one by one to the other interface boards except for the interface board. In the following example, continuously use ID "51" to represent the Ethernet data packet received by the first Ethernet switch chip 31. But it should be understood that, in the following example, an Ethernet data packet denoted with ID "51" may be different from foregoing Ethernet data packet 51.

Figure 7:
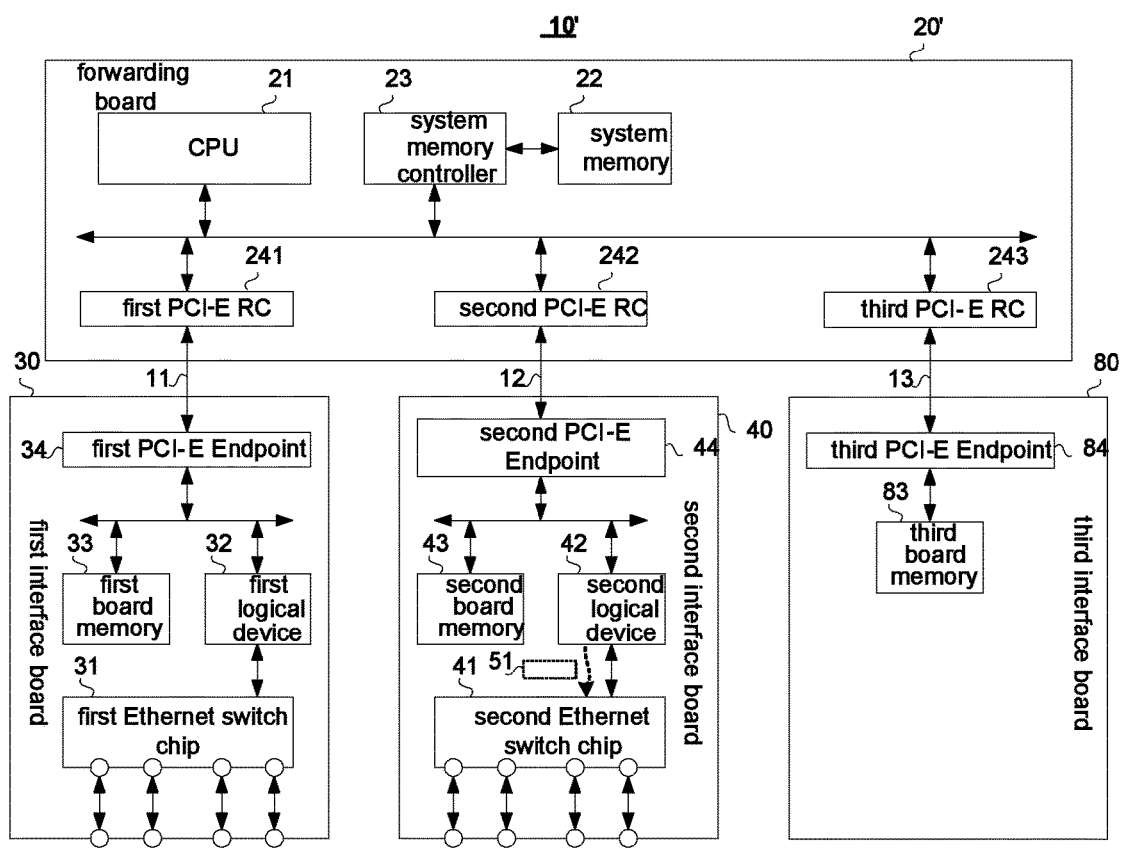
FIG. 7 is a schematic diagram illustrating extension structure of the network device, which is shown in FIG. 1.

Please refer to FIG. 7, a network device 10' may further include a third interface board 80. The third interface board 80 may include a third PCI-E Endpoint 84 and a third board memory 83. Correspondingly, a forwarding board 20' may further include a third PCI-E RC 243. The third PCI-E RC 243 may be connected with the third PCI-E Endpoint 84 through a third PCI-E bus 13. Similar to the first PCI-E RC 241 and second PCI-E RC 242, the third PCI-E RC 243 may be an independent entity with PCI-E RC, which may also be an equivalent PCI-E RC formed logically.

Figure 8:
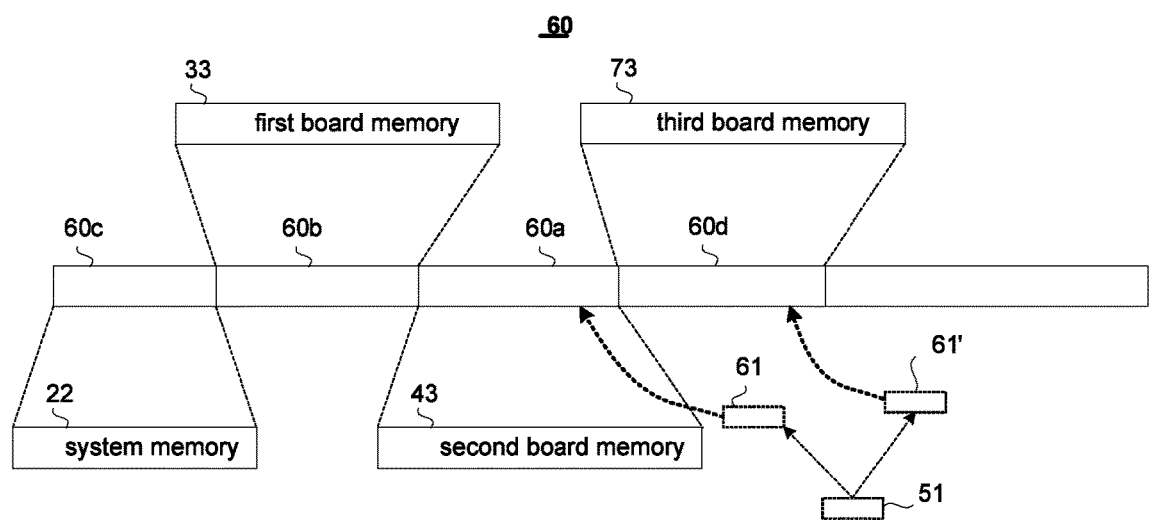
FIG. 8 is a schematic diagram illustrating mapping of PCI-E memory space, which is in the network device shown in FIG. 7.

As shown in FIG. 8, the third board memory 83 may map to the PCI-E memory space 60. Besides, an address range 60*d* in the PCI-E memory space 60 mapped by the third board memory 83 may be different from address ranges 60*c*, 60*b* and 60*a* in the PCI-E memory space, which are respectively mapped by the system memory 22, the first board memory 33 and the second board memory 43. The board ID issued by the CPU 21 when being initialized, and all the entries in the mapping table 72, which is between a PCI-E memory space address and a board ID, may further include an entry corresponding to the third interface board 80. The third PCI-E RC 243 and the third PCI-E Endpoint 84 may also be mapped to the PCI-E memory space 60.

Figure 9:
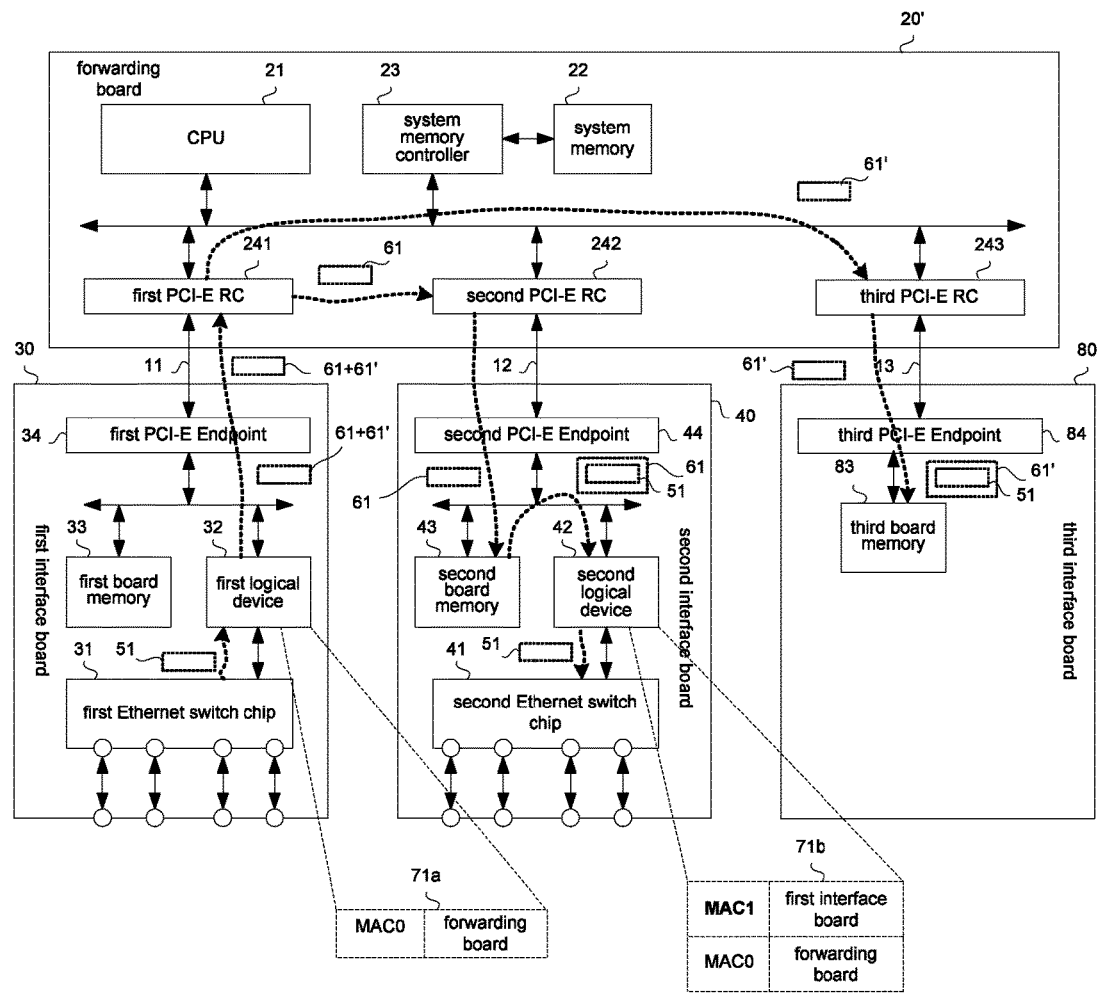
FIG. 9 is a schematic diagram illustrating a principle for forwarding a packet, which is mapped by the PCI-E memory space shown in FIG. 8.

Please refer to FIG. 9 and take into account FIG. 8:

When receiving the Ethernet data packet 51 from the first Ethernet switch chip 31, the first logical device 32 may determine the destination board of the Ethernet data packet 51, by matching an entry in the mapping table 71*a*;

when not matching an entry in the mapping table 71*a*, that is, the first logical device 32 may determine that the forwarding board 20 is not the destination board of the Ethernet data packet 51 (for example, the mapping table 71*a* has an initial entry of MAC0 corresponding to the forwarding board 20), at this time, the destination MAC of the Ethernet data packet 51 may be a boardcast address. And then, the first logical device 32 may encapsulate the Ethernet data packet 51 into PCI-E packets 61 and 61', which respectively take the PCI-E memory space address of the second board memory 43 (that is, address within the address range 60*a* shown in FIG. 8) and the PCI-E memory space address of the third board memory 83 (that is, address within the address range 60*d* shown in FIG. 8), based on the mapping table 72, such that the first PCI-E Endpoint 34 may transmit the PCI-E packets 61 and 61' to the first PCI-E RC 241, and enable the first PCI-E RC 241 to respectively forward the PCI-E packets 61 and 61' to the second PCI-E RC 242 and the third PCI-E RC 243, based on the destination addresses of the PCI-E packets 61 and 61'.

Subsequently, the PCI-E packet 61 encapsulated with the Ethernet data packet 51 may arrive at the second interface board 40, and enable the second logical device 42 in the second interface board 40 to create an entry corresponding to the first interface board in the mapping table 71*b*. Similarly, the PCI-E packet 61' may arrive at the third interface board 80. Besides, the third interface board 80 may possess a device similar to the first logical device 32 or the second logical device 42 (not shown in FIG. 7 and FIG. 9). The device may analyze the Ethernet data packet 51, and create an entry corresponding to the first interface board 30 in the mapping table between an Ethernet MAC address and a board ID.

Figure 10:
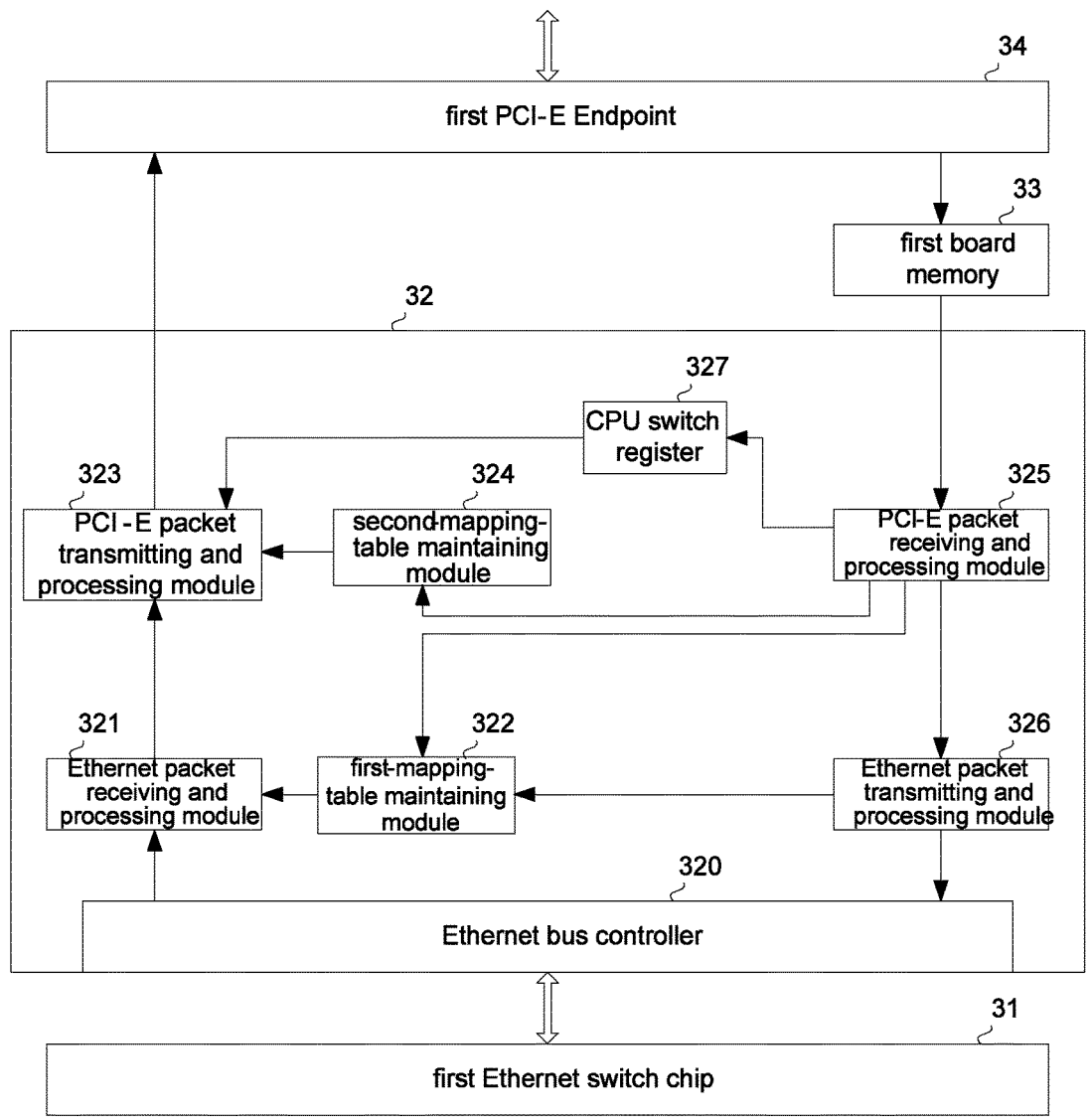
FIG. 10 is a schematic diagram illustrating logical structure of a first logical device, which is in the network device shown in FIG. 1 or FIG. 7.

Based on foregoing principle, please refer to FIG. 10, the first logical device 32 may include an Ethernet bus controller 320, an Ethernet packet receiving and processing module 321, a first-mapping-table maintaining module 322, a PCI-E packet transmitting and processing module 323, a second-mapping-table maintaining module 324, a PCI-E packet receiving and processing module 325, an Ethernet packet transmitting and processing module 326 and a CPU switch register 327.

Please refer to FIG. 11, based on the structure shown in FIG. 10, working principle of the first logical device 32 may be as follows (since processing methods for the Ethernet data packets 51 and 53 in the first logical device 32 are basically the same, and processing methods for the PCI-E packets 61 and 63 in the first logical device 32 are basically the same, to simplify the view, the Ethernet data packet 53 and the PCI-E packet 63 are omitted in FIG. 11):

The Ethernet bus controller 320 may be connected with the first Ethernet switch chip 31 of the interface board, such that Ethernet data packets 51 and 52 may be interacted between the first logical device 32 and the first Ethernet switch chip 31.

The Ethernet packet receiving and processing module 321 may receive the Ethernet data packet 51 from the first Ethernet switch chip 31 via the Ethernet bus controller 320.

The first-mapping-table maintaining module 322 may maintain a mapping table 71*a*, which is between an Ethernet MAC address and a board ID, such that the Ethernet packet receiving and processing module 321 may determine the destination board of the Ethernet data packet 51, by matching an entry in the mapping table 71*a*.

After completing the matching, the Ethernet packet receiving and processing module 321 may transmit the Ethernet data packet 51 and a matching result to the PCI-E packet transmitting and processing module 323. The matching result here may be a board ID of a destination board matched successfully, or a failed matching. In FIG. 11, the matching result may be the board ID of the matched second interface board 40 (denoted with S1111 in FIG. 11).

The PCI-E packet transmitting and processing module 323 may encapsulate the received Ethernet data packet 51.

The second-mapping-table maintaining module 324 may maintain a mapping table 72, which is between a board ID and a PCI-E memory space address, such that the PCI-E packet transmitting and processing module 323 may determine the destination address of the encapsulated PCI-E packet 61, by matching an entry in the mapping table 72.

After completing the matching, the PCI-E packet transmitting and processing module 323 may encapsulate the Ethernet data packet 51 into the PCI-E packet 61, determine the destination address of the PCI-E packet 61 based on the matching result, and then, provide the PCI-E packet 61 to the first PCI-E Endpoint 34.

Figure 11:
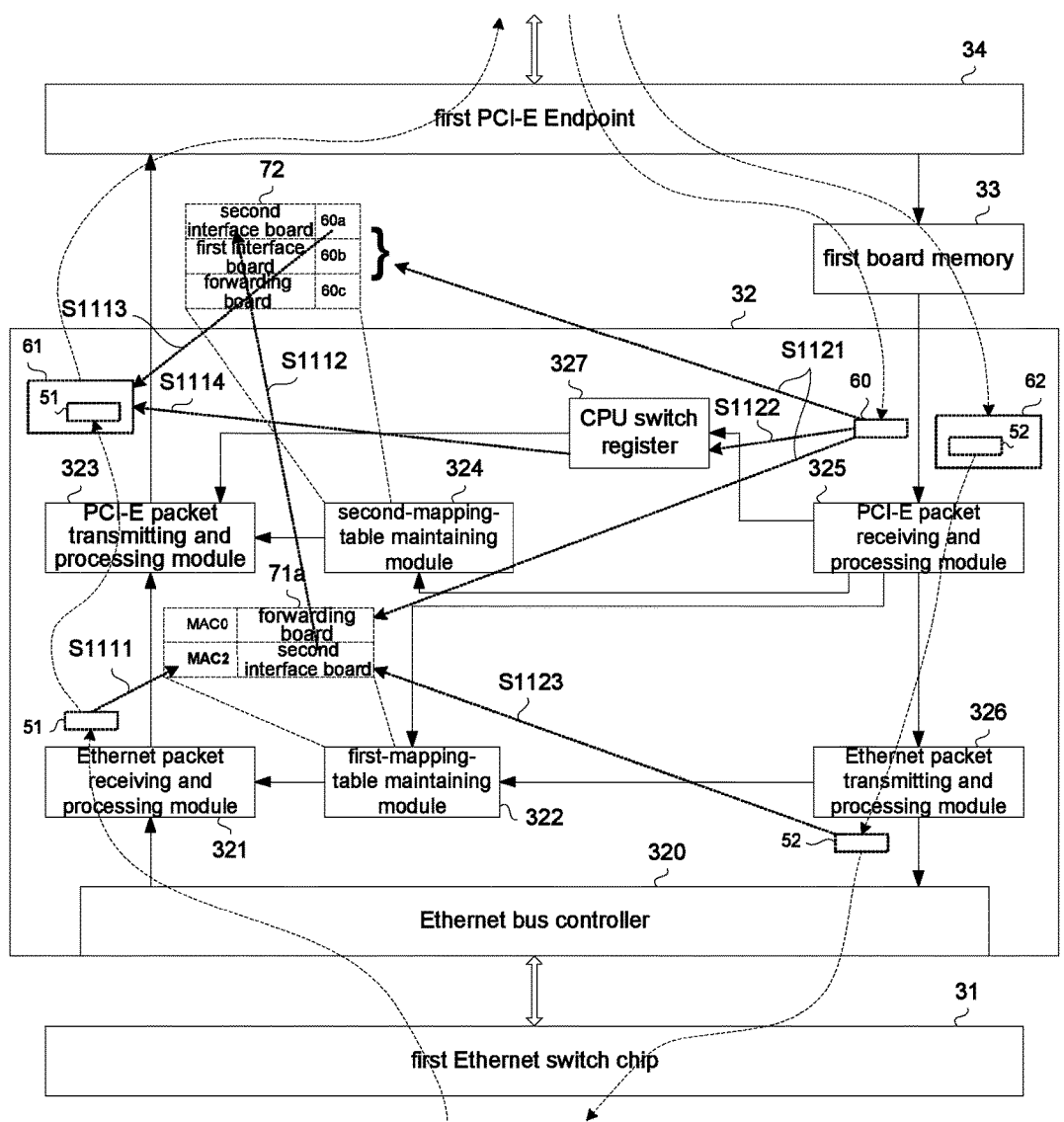
FIG. 11 is a schematic diagram illustrating working principle of the first logical device, which is shown in FIG. 10.

The matching result here may be a board ID of a determined destination board, or board IDs of all the remaining interface boards (when not determining the destination board), in the example illustrated with FIG. 11, the address range of the matched second board memory 43 is 60*a* (denoted with S1112 and S1113 in FIG. 11).

In a case when it is failed to determine the destination board: the first-mapping-table maintaining module 322 may maintain entries corresponding to all the other interface boards (that is, the second interface board 40 and the third interface board 80) except for the first interface board 30 in the network device 10; the Ethernet packet receiving and processing module 321 may report all the other interface boards except for the first interface board 30 in the network device 10 to the PCI-E packet transmitting and processing module 323, such that the PCI-E packet transmitting and processing module 323 may match all the entries of the other interface boards except for the first interface board 30 one by one; in another example, the Ethernet packet receiving and processing module 321 may report a notification about failed matching to the PCI-E packet transmitting and processing module 323, such that the PCI-E packet transmitting and processing module 323 may poll entries of all the other interface boards except for the first interface board 30.

In addition, the CPU switch register 327 may store the board ID of the first interface board, which is issued by the CPU 21. The PCI-E packet transmitting and processing module 323 may encapsulate the board ID of the first interface board into the PCI-E packet 61 (denoted with S1114 in FIG. 11), such that another interface board (includes, but is not limited to, the second interface board 40) receiving the PCI-E packet 61 may learn a mapping entry corresponding to the first interface board, which is between an Ethernet MAC address and a board ID, by using the board ID of the first interface board and the source MAC address of the Ethernet data packet 51.

The PCI-E packet receiving and processing module 325 may read PCI-E packets 60 and 62 from the first board memory 33, in which the PCI-E packets 60 and 62 respectively take the first interface board as the destination board.

The PCI-E packet receiving and processing module 325 may analyze entries from the PCI-E packet 60, which are issued by the CPU 21 when initializing the network device 10, and write the entries into the first-mapping-table maintaining module 322 and the second-mapping-table maintaining module 324 (denoted with S1121 in FIG. 11). Besides, the PCI-E packet receiving and processing module 325 may analyze the board ID of the first interface board from the PCI-E packet 60, which is issued by the CPU 21 when initializing the network device 10, and write the board ID of the first interface board into the CPU switch register 327 (denoted with S1122 in FIG. 11).

The PCI-E packet receiving and processing module 325 may analyze the PCI-E packet 62, and obtain the Ethernet data packet 52 coming from the second interface board 40 and the board ID of the second interface board 40, forward the obtained Ethernet data packet 52 and the board ID of the second interface board 40 to the Ethernet packet transmitting and processing module 326.

The Ethernet packet transmitting and processing module 326 may extract the source MAC address from the received Ethernet data packet 52, and create an entry corresponding to the second interface board 40 in the first-mapping-table maintaining module 322, by using the extracted source MAC address and the received board ID of the second interface board 40.

The Ethernet packet transmitting and processing module 326 may also transmit the received Ethernet data packet 52 to the Ethernet bus controller 320.

The second logical device 42 may possess a structure similar to that of the first logical device 32.

Figure 12:
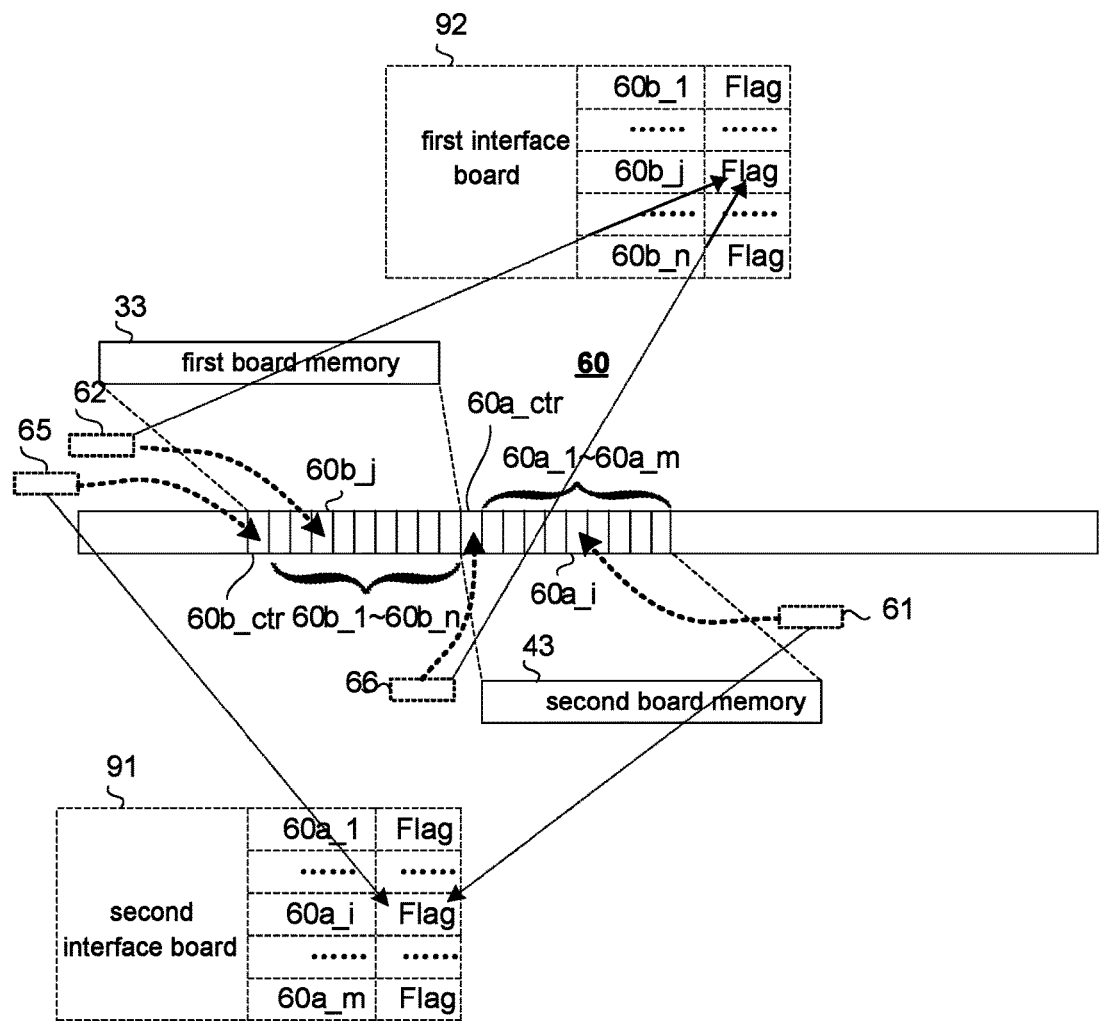
FIG. 12 is a diagram illustrating buffer-mechanism-based mapping of the PCI-E memory space, which is in the network device shown in FIG. 1.

Please refer to FIG. 12, in another example, the address range 60*a* in the PCI-E memory space 60 mapped by the second board memory 43 may include multiple data packet buffers 60*a*_1~60*a*_*m* (m is a positive integer greater than 1), and at least one control packet buffer 60*a*_ctr. Similarly, the address range 60*b* in the PCI-E memory space 60 mapped by the first board memory 33 may include multiple data packet buffers 60*b*_1~60*b*_*n* (n is a positive integer greater than 1), and at least one control packet buffer 60*b*_ctr.

Correspondingly, the mapping table 72 between a board ID and a PCI-E memory space address, which is maintained by the first logical device 32, may include an entry 91 corresponding to the second interface board 40. The entry 91 may be divided into various sub-entries corresponding to multiple data packet buffers 60*a*_1~60*a*_*m*. Besides, each sub-entry may possess a Flag, which may represent whether state of a data packet buffer 60*a*_*i* (i is a positive integer greater than or equal to 1, meanwhile i is less than or equal to m) corresponding to the sub-entry is occupied or idle. Similarly, the mapping table 72 between a board ID and a PCI-E memory space address, which is maintained by the second logical device 42, may include an entry 92 corresponding to the first interface board 30. The entry 92 may be divided into multiple sub-entries, which may respectively correspond to multiple data packet buffers 60*b*_1~60*b*_*n*. Besides, each sub-entry may possess a Flag, which may represent whether state of a data packet buffer 60*b*_*j* (j is a positive integer greater than or equal to 1, meanwhile j is less than or equal to n) corresponding to the sub-entry is occupied or idle.

In addition, the control packet buffers 60*a*_ctr and 60*b*_ctr may be taken as sub-entries without Flag in the mapping table 72, or, may be stored independent of the mapping table 72.

Figure 13A:
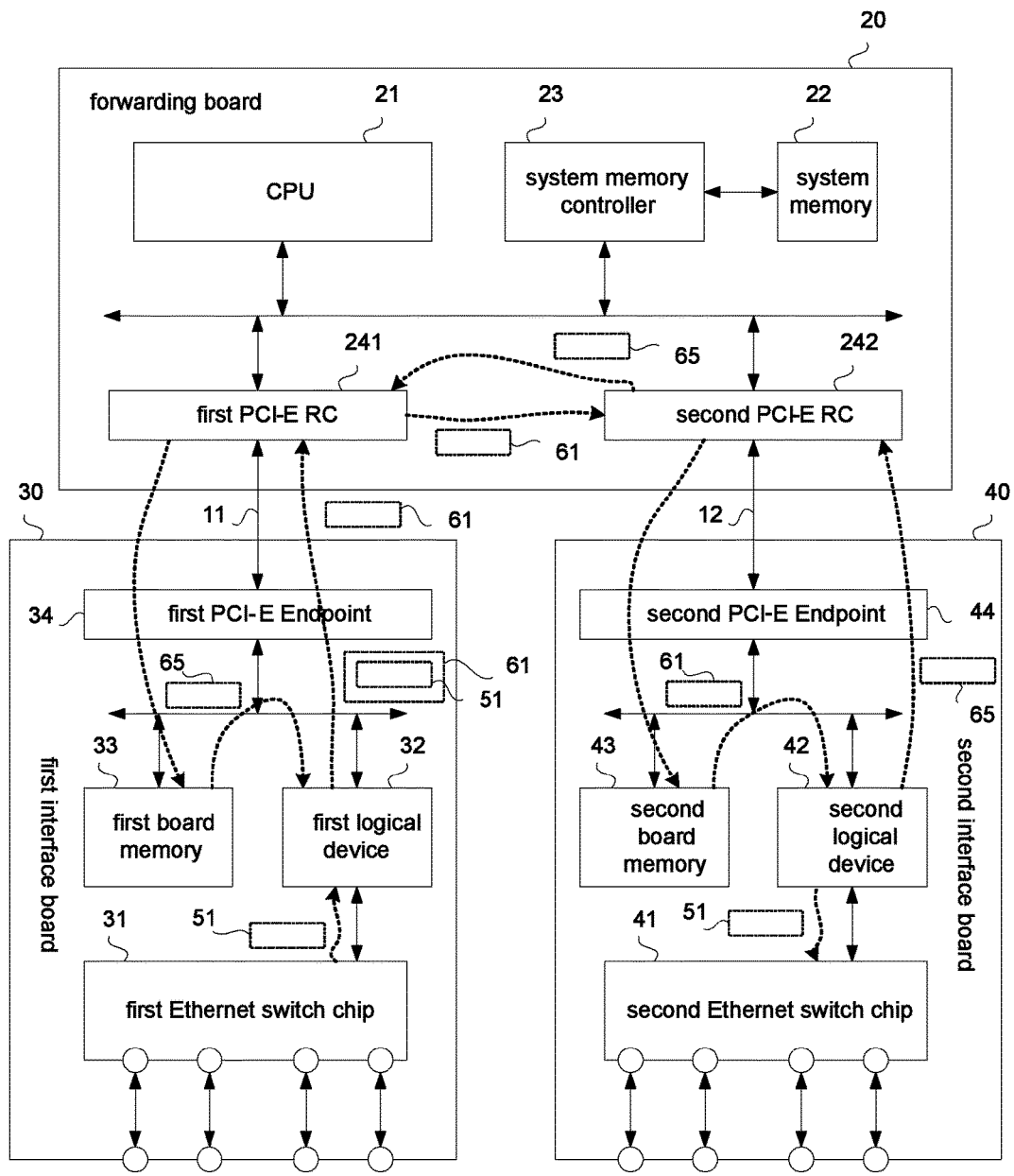
FIG. 13A is a schematic diagram illustrating a principle for forwarding a packet, which is mapped by the PCI-E memory space shown in FIG. 12

Please refer to FIG. 13A and take into account FIG. 12, in a case where forwarding is performed from the first interface board 30 to the second interface board 40:

when the first logical device 32 in the first interface board 30 receives the Ethernet data packet 51 from the first Ethernet switch chip 31, the first logical device 32 may determine the destination board of the Ethernet data packet 51.

When determining that the destination board of the Ethernet data packet 51 received from the first Ethernet switch chip 31 is the second interface board 40, the first logical device 32 may select an idle data packet buffer 60*a*_*i* from multiple data packet buffers 60*a*_1~60*a*_*m*, which are in the PCI-E memory space 60 mapped by the second board memory 43, and set Flag of a sub-entry corresponding to the data packet buffer 60*a*_*i* to be occupied, and then, encapsulate the Ethernet data packet 51 into a PCI-E packet 61, which takes the PCI-E memory space address of the data packet buffer 60*a_i* as destination address, such that the first PCI-E Endpoint 34 may transmit the PCI-E packet 61 to the first PCI-E RC 241, and the first PCI-E RC 241 may forward the PCI-E packet 61 to the second PCI-E RC 242, based on the destination address of the PCI-E packet 61.

That is, the destination address of the PCI-E packet 61, which is set by the first logical device 32, may be the PCI-E memory space address of the idle data packet buffer 60*a_i* mapped by the second board memory 43.

Correspondingly, when the PCI-E packet 61 encapsulated with the Ethernet data packet 51 is forwarded by the second PCI-E RC 242 to the second PCI-E Endpoint 44, and is written by the second PCI-E Endpoint 44 into address range in the second board memory 43 corresponding to the data packet buffer 60*a_i*, the second logical device 42 may obtain the PCI-E packet 61 from the second board memory 43, analyze the Ethernet data packet 51 from the PCI-E packet 61, and transmit the Ethernet data packet 51 to the second Ethernet switch chip 41, such that the second Ethernet switch chip 41 may forward the Ethernet data packet 51 to the exterior of the network device 10.

Besides, the second logical device 42 may also create a PCI-E packet 65, which takes the control packet buffer 60*b_ctr* as the destination address, such that the second PCI-E Endpoint 44 may transmit the PCI-E packet 65 to the second PCI-E RC 242. And then, the second PCI-E RC 242 may forward the PCI-E packet 65 to the first PCI-E RC 241, based on the destination address of the PCI-E packet 65. The PCI-E packet 65 may also carry release information of data packet buffer, which indicates to release the data packet buffer 60*a_i*.

Correspondingly, when the PCI-E packet 65 encapsulated with the release information of data packet buffer is forwarded by the first PCI-E RC 241 to the first PCI-E Endpoint 34, and is written by the first PCI-E Endpoint 34 into address range in the first board memory 33 corresponding to the control packet buffer 60*b_ctr*, the first logical device 32 may obtain the PCI-E packet 65 from the first board memory 33, analyze the release information of data packet buffer from the PCI-E packet 65, so as to set Flag of the sub-entry corresponding to the data packet buffer 60*a_i* to be idle, based on the release information of data packet buffer.

Figure 13B:
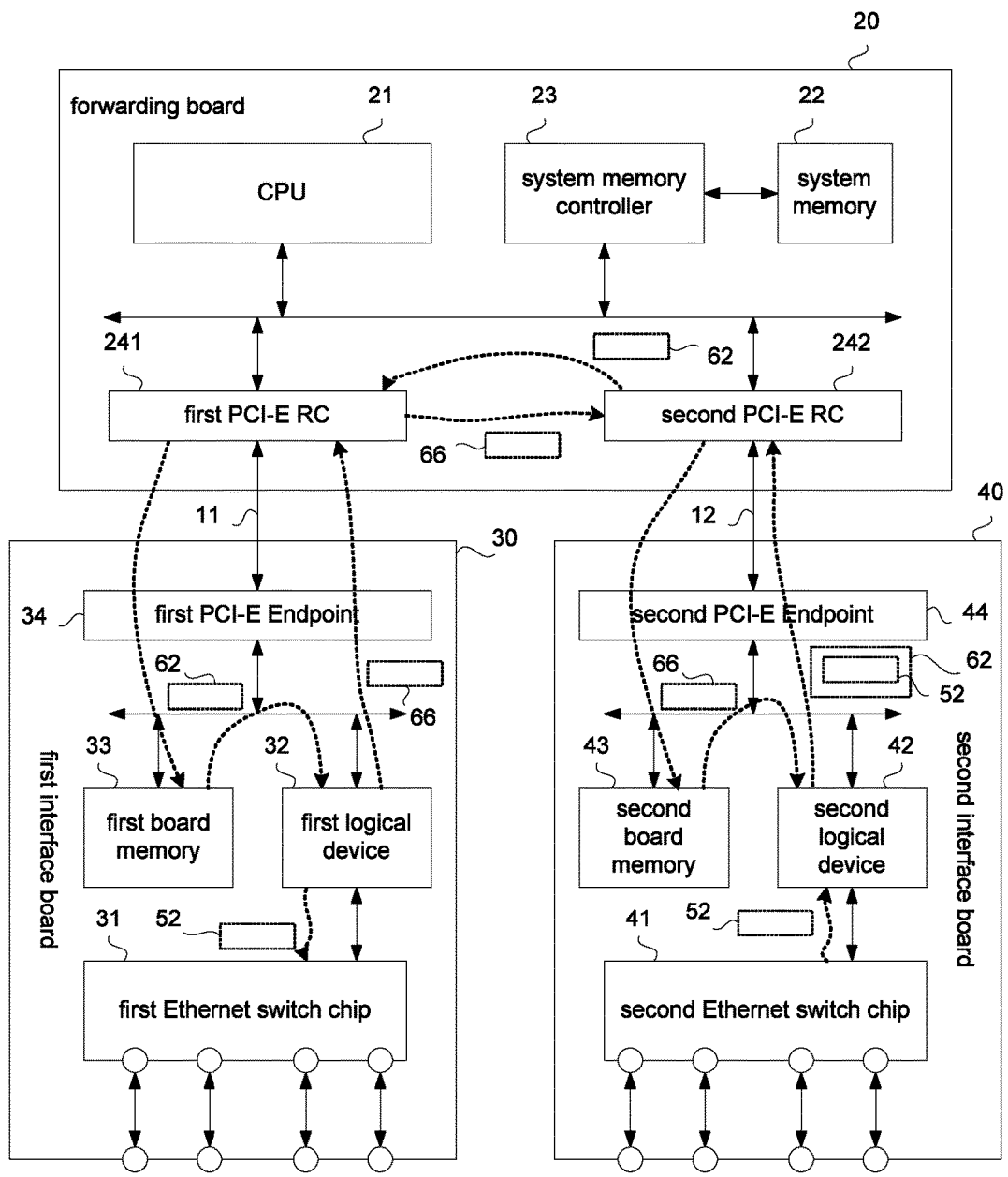
FIG. 13B is a schematic diagram illustrating a principle for forwarding a packet, which is mapped by the PCI-E memory space shown in FIG. 12.

Please refer to FIG. 13B and take into account FIG. 12, similar to the forwarding from the first interface board 30 to the second interface board 40, the destination address of the PCI-E packet 62, which is set by the second logical device 42, may be PCI-E memory space address of an idle data packet buffer 60*b_j* mapped by the first board memory 33. Besides, the second logical device 42 may set the Flag of the sub-entry corresponding to the data packet buffer 60*b_j* to be occupied. Correspondingly, the first logical device 32 may also create a PCI-E packet 66, which takes the control packet buffer 60*a_ctr* as the destination address, such that the second logical device 42 may set the Flag of the sub-entry corresponding to the control packet buffer 60*a_ctr* to be idle.

Based on foregoing contents, it can be seen that after dividing the PCI-E memory space address, an anti-pressure flow control may be performed to the forwarding of an Ethernet data packet between the first interface board 30 and the second interface board 40.

Figure 14:
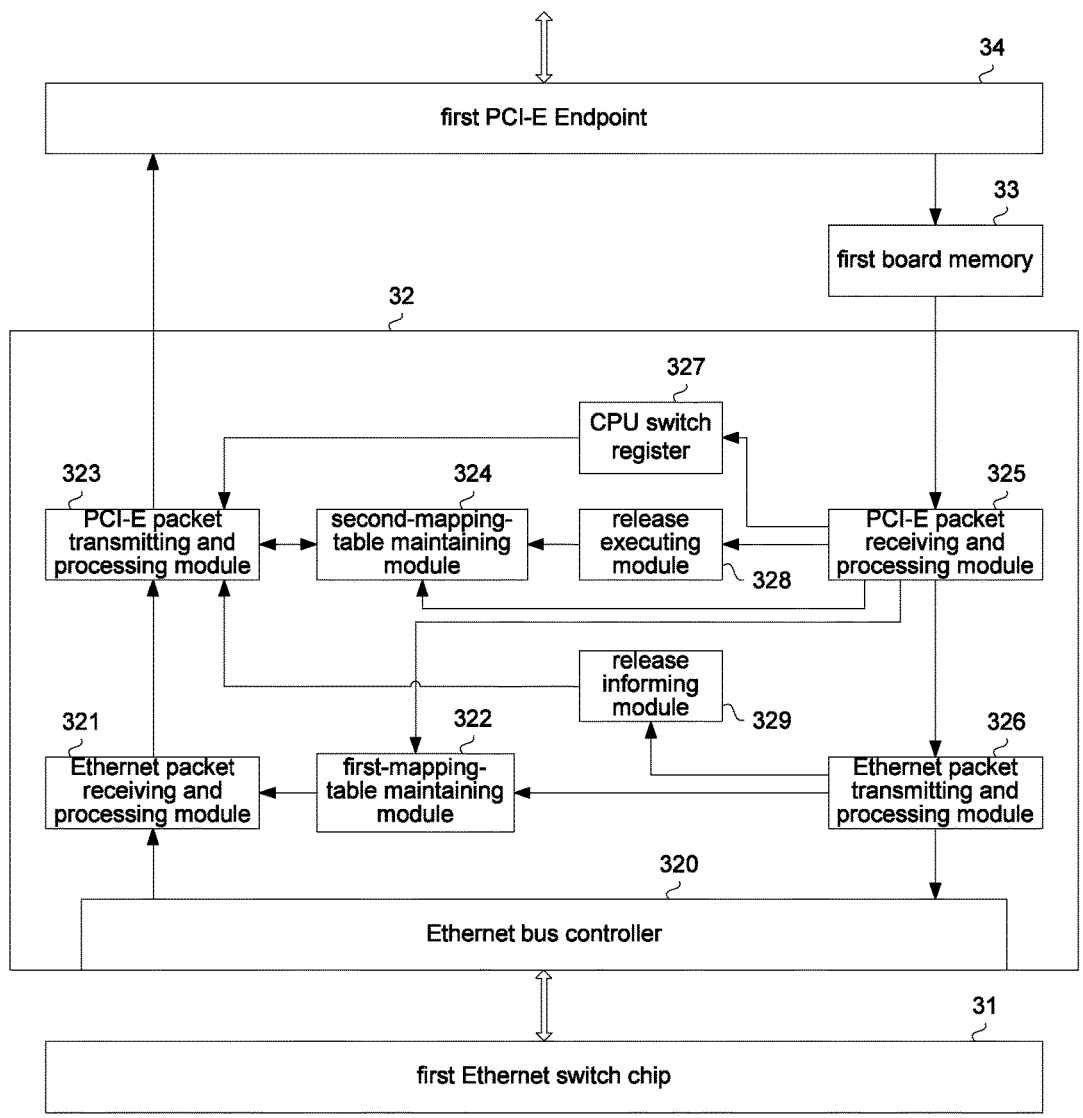
FIG. 14 is a schematic diagram illustrating logical structure of the first logical device, which is in the network device shown in FIG. 13a and FIG. 13b.

Please refer to FIG. 14, after dividing the PCI-E memory space address into different buffers, the first logical device 32 may further include a release executing module 328 and a release informing module 329.

Figure 15A:
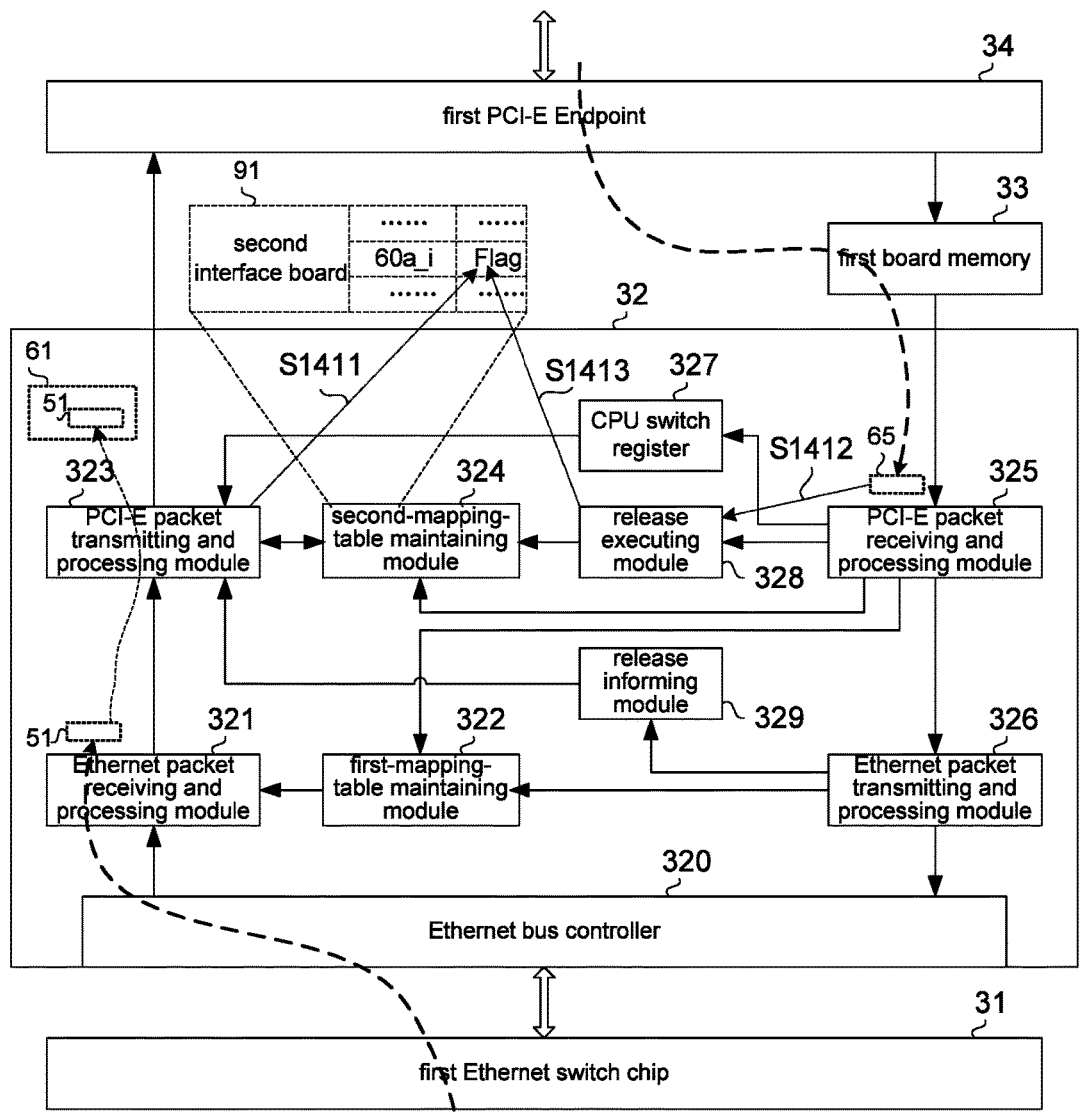
FIG. 15A is a schematic diagram illustrating working principle of the first logical device, which is shown in FIG. 14.

Please refer to FIG. 15A, when encapsulating the Ethernet data packet 51 into the PCI-E packet 61, which takes the PCI-E memory space address of the data packet buffer 60*a_i* as destination address, the PCI-E packet transmitting and processing module 323 may set the Flag of a sub-entry corresponding to the data packet buffer 60*a_i* to be occupied (denoted with S1411 in FIG. 15A). Besides, when reading the PCI-E packet 65 from the address range in the first board memory 33 corresponding to the control packet buffer 60*b_ctr* of the first interface board, the PCI-E packet receiving and processing module 325 may analyze the release information of data packet buffer from the PCI-E packet 65, and provide for the release executing module 328. Subsequently, the release executing module 328 may set the Flag of the sub-entry corresponding to the data packet buffer 60*a_i* to be idle (denoted with S1412 in FIG. 15A), based on the release information of data packet buffer provided by the PCI-E packet receiving and processing module 325.

Figure 15B:
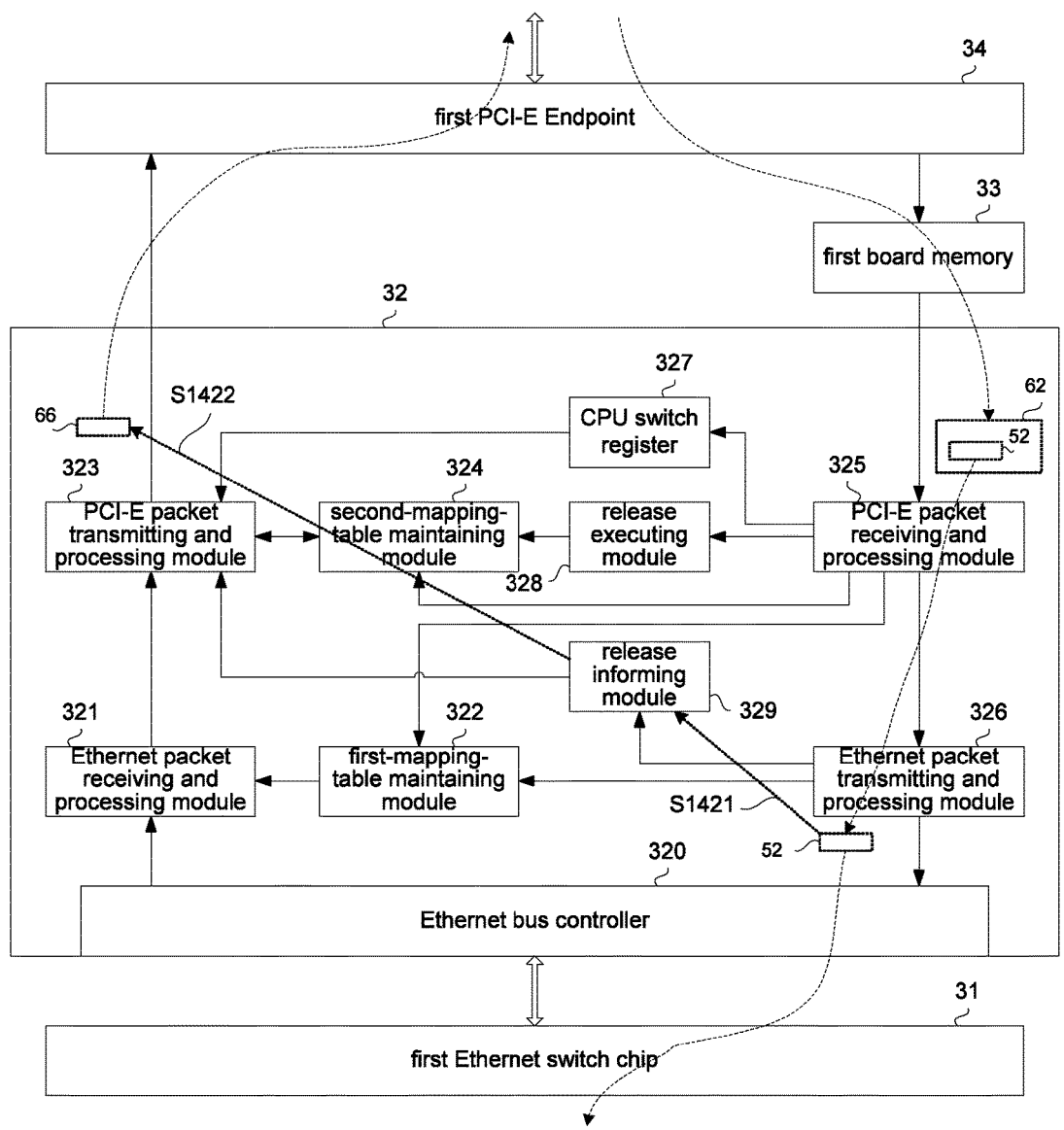
FIG. 15B is a schematic diagram illustrating working principle of the first logical device, which is shown in FIG. 14

Please refer to FIG. 15B, when reading the PCI-E packet 62 from the address range corresponding to the data packet buffer 60*b_j* in the first board memory 33, the PCI-E packet receiving and processing module 325 may analyze the Ethernet data packet 52 from the PCI-E packet 62, extract the destination address of the PCI-E packet 62 and carried board ID of the second interface board 40, and provide for the Ethernet packet transmitting and processing module 326. Subsequently, when transmitting the Ethernet data packet 52, the Ethernet packet transmitting and processing module 326 may provide the destination address of the PCI-E packet 62 and the board ID of the second interface board 40 to the release informing module 329. Thus, the release informing module 329 may inform the PCI-E packet transmitting and processing module 323 to create a PCI-E packet 66, which corresponds to the control packet buffer 60*a_ctr* of the second interface board 40, based on the destination address of the PCI-E packet 62 and board ID of the second interface board 40, and enable the PCI-E packet 66 to carry the destination address of the PCI-E packet 62 (that is, the PCI-E memory space address of the data packet buffer 60*b_j*), which is taken as the release information of data packet buffer.

Foregoing is detailed descriptions for the network device in above examples. In the following examples, a method for forwarding packets in a network device is further provided.

Figure 16:
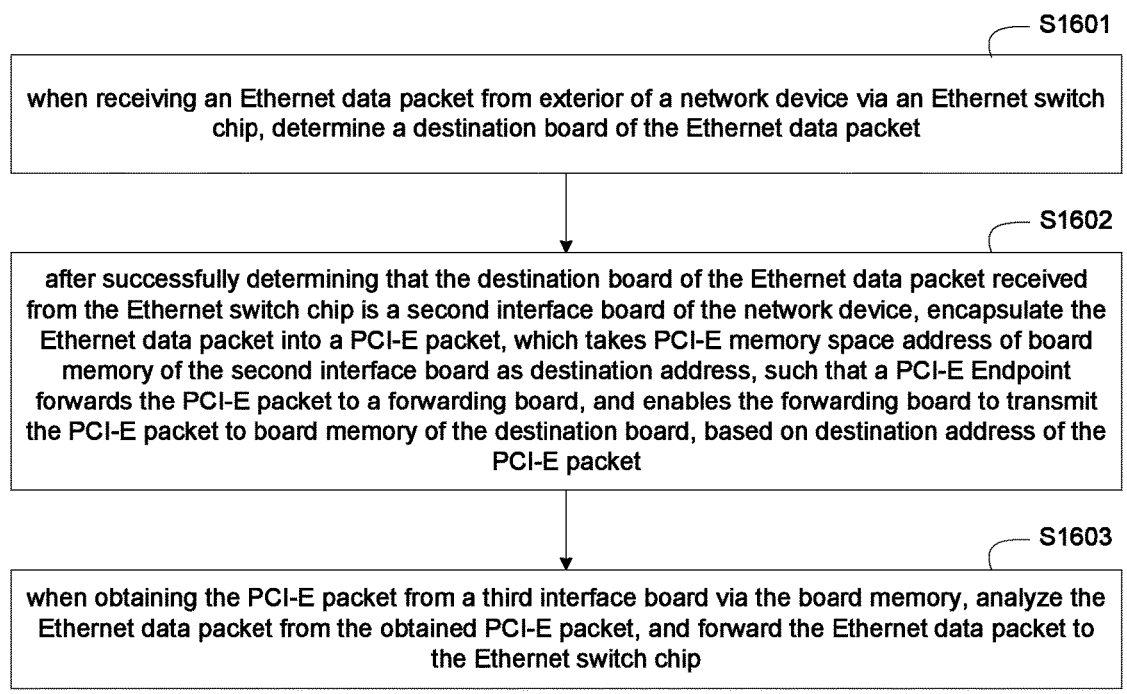
FIG. 16 is a flow chart illustrating a method for forwarding a packet, in accordance with an example of the present disclosure.

Please refer to FIG. 16, when the method for forwarding packets is applied to the first interface board 30 or the second interface board 40 in the network device 10 shown in FIG. 1, the method for forwarding packets may include the following blocks, which are executed by the first logical device 32 or the second logical device 42.

In block S1601, when receiving an Ethernet data packet from an exterior of a network device via an Ethernet switch chip, determine a destination board of the Ethernet data packet.

In block S1602, after successfully determining that the destination board of the Ethernet data packet received from the Ethernet switch chip is a second interface board of the network device, encapsulate the Ethernet data packet into a PCI-E packet, which may take PCI-E memory space address of board memory of the second interface board as destination address, such that a PCI-E Endpoint may forward the PCI-E packet to a forwarding board, and enable the forwarding board to transmit the PCI-E packet to board memory of the destination board, based on the destination address of the PCI-E packet In block S1603, when obtaining a PCI-E packet from a third interface board via the board memory, analyze the Ethernet data packet from the obtained PCI-E packet, and forward the Ethernet data packet to the Ethernet switch chip In addition, in block S1601, when determining that the destination board of the Ethernet data packet received from the first Ethernet switch chip is the forwarding board, the method may further include: encapsulate the Ethernet data packet into the PCI-E packet, which takes the PCI-E memory space address of the system memory as the destination address, such that the PCI-E Endpoint may forward the PCI-E packet to the forwarding board, and write the PCI-E packet into the system memory of the forwarding board.

In the example, the method may further maintain a mapping table between a board ID and a PCI-E memory space address, so as to determine the destination address of the PCI-E packet encapsulated with the Ethernet data packet, based on the destination board of the Ethernet data packet received from the Ethernet switch chip; besides, create an entry in the second mapping table, based on configurations of the CPU in the forwarding board.

In the example, the method may further maintain a mapping table between an Ethernet MAC address and a board ID. Besides, the method may analyze the Ethernet data packet (received from exterior of the network device) from the PCI-E packet received from another interface board, and board ID of the another interface board, and create an entry corresponding to the another interface board in the second mapping table, based on source MAC address of the analyzed Ethernet data packet and board ID carried by the PCI-E packet. Besides, the method further match an entry corresponding to the forwarding board in a first mapping table, which is between an Ethernet MAC address and a board ID, based on configurations of the CPU when initializing the network device. At this time, in foregoing block S1601, determine the destination board of the Ethernet data packet, based on destination MAC board of the Ethernet data packet.

In the example, when the destination board of the Ethernet data packet received from the Ethernet switch chip is not determined, the method may further include: encapsulate the Ethernet data packet into at least two PCI-E packets, which respectively take PCI-E memory space address of board memory of each remaining interface board in the network device as destination address, such that the PCI-E Endpoint may forward the at least two PCI-E packets to the forwarding board, and enable the forwarding board to respectively forward the at least two PCI-E packets to corresponding other interface boards, based on the destination addresses of the at least two PCI-E packets.

In addition, in the method of the example, an anti-pressure flow control mechanism similar with the principle of FIG. 12 may also be applied, correspondingly:

The address range in the PCI-E memory space mapped by board memory of each interface board may include multiple data packet buffers, and at least one control packet buffer. Besides, the method may further include:

When determining that the destination board of the Ethernet data packet received from the Ethernet switch chip is another interface board (such as the second interface board), take a PCI-E memory space address of an idle data packet buffer mapped by the board memory of the second interface board as the pre-set destination address of the PCI-E packet. Besides, change the recorded state of the data packet buffer corresponding to the second interface board from idle to occupied, based on the destination address of the PCI-E packet.

When forwarding the second Ethernet data packet analyzed from the second PCI-E packet coming from the third interface board to the Ethernet switch chip, create a third PCI-E packet carrying release information of a data packet buffer, and the created third PCI-E packet may take the control packet buffer mapped by board memory of the third interface board as destination address, such that the PCI-E Endpoint may forward the created third PCI-E packet to the forwarding board, and enable the forwarding board to forward the third PCI-E packet to the third interface board, based on destination address of the created third PCI-E packet.

When analyzing the release information of data packet buffer from the PCI-E packet received from the another interface board, change the recorded state of the data packet buffer corresponding to the another interface board from occupied to idle, based on the analyzed release information of data packet buffer.

Based on foregoing contents, it can be seen that in the above example, after the interface board receives the Ethernet data packet from the Ethernet switch chip, when determining that the destination board of the Ethernet data packet is another interface board, the logical device of the interface board may encapsulate the Ethernet data packet into a PCI-E packet, which takes PCI-E memory space address of board memory of the another interface board as destination address, such that the PCI-E packet may be forwarded by the forwarding board to the board memory of the another interface board. Besides, when an interface board obtains a PCI-E packet from another interface board via the board memory, the logical device in the interface board may analyze the Ethernet data packet from the PCI-E packet, and forward the Ethernet data packet. Subsequently, it is not necessary for the CPU to participate in the forwarding of the Ethernet data packet between interface boards, thereby improving forwarding performance.

The invention claimed is:

1. A first interface board of a network device, wherein, comprising a Peripheral Component Interconnect Express (PCI-E) Endpoint, an Ethernet switch chip, a board memory, and a logical device; wherein the PCI-E Endpoint is to connect with a PCI-E root complex (RC) in a forwarding board of the network device via a PCI-E bus, wherein the PCI-E RC corresponds to the first interface board;

the Ethernet switch chip is to receive a first Ethernet data packet from an exterior of the network device;

the board memory is mapped to PCI-E memory space in the network device, wherein an address range in the PCI-E memory space mapped by the board memory is different from address ranges in the PCI-E memory space, which are mapped by a board memory of each remaining interface board, and mapped by a system memory of the forwarding board;

the logical device is to receive the first Ethernet data packet from the Ethernet switch chip, and determine a destination board of the first Ethernet data packet;

wherein when determining that the destination board of the first Ethernet data packet received from the Ethernet switch chip is a second interface board of the network device, the logical device is further to encapsulate the first Ethernet data packet into a first PCI-E packet, which takes a PCI-E memory space address of a board memory of the second interface board as destination address, such that the PCI-E Endpoint forwards the first PCI-E packet to the forwarding board of the network device;

the logical device is further to obtain from the board memory a second PCI-E packet coming from a third interface board, parse out a second Enternet data packet from the obtained second PCI-E packet, and transmit the second Ethernet data packet to the Ethernet switch chip, wherein the third interface board is the same as the second interface board, or is different from the second interface board.

2. The first interface board according to claim 1, wherein the logical device is further to maintain a first mapping table between an Ethernet media access control (MAC) address and a board identity (ID), so as to determine the destination board of the first Ethernet data packet, based on the destination MAC address of the first Ethernet data packet;

wherein the second PCI-E packet coming from the third interface board is encapsulated with the second Ethernet data packet, which is received by the third interface board from the exterior of the network device, and carries a board ID of the third interface board;

the logical device is further to create an entry corresponding to the third interface board in the first mapping table, based on the source MAC address of the second Ethernet data packet parsed out from the second PCI-E packet and the board ID carried by the second PCI-E packet.

3. The first interface board according to claim 1, wherein the logical device is further to maintain a second mapping table between a board identity (ID) and a PCI-E memory space address, so as to determine the destination address of the first PCI-E packet encapsulated with the first Ethernet data packet, based on the destination board of the first Ethernet data packet received from the Ethernet switch chip, and create an entry in the second mapping table, based on configurations of a central processing unit (CPU) of the forwarding board.

4. The first interface board according to claim 1, wherein when it fails to determine the destination board of the first Ethernet data packet received from the Ethernet switch chip, the logical device is further to encapsulate the first Ethernet data packet into a PCI-E packet, which takes the PCI-E memory space address of the board memory of each remaining interface board in the network device as the destination address, such that the PCI-E Endpoint forwards the PCI-E packet to the forwarding board.

5. The first interface board according to claim 1, wherein the address ranges in the PCI-E memory space mapped by the board memories of the first interface board and the remaining interface boards comprise multiple data packet buffers, and at least one control packet buffer;

when determining that the destination board of the first Ethernet data packet received from the Ethernet switch chip is the second interface board, the logical device is further to set the destination address of the first PCI-E packet to be the PCI-E memory space address of an idle data packet buffer, which is mapped by the board memory of the second interface board;

the logical device is further to change a recorded state of the data packet buffer corresponding to the second interface board from idle to occupied, based on the destination address of the first PCI-E packet;

when transmitting the second Ethernet data packet to the Ethernet switch chip, wherein the second Ethernet data packet is parsed out from the second PCI-E packet coming from the third interface board, the logical device is further to create a third PCI-E packet carrying release information of a data packet buffer, wherein the created third PCI-E packet takes a control packet buffer mapped by board memory of the third interface board as the destination address, such that the PCI-E Endpoint forwards the created third PCI-E packet to the forwarding board, the data packet buffer corresponding to the release information is the destination address of the second PCI-E packet;

when parsing out release information of a data packet buffer from a fourth PCI-E packet, which is received from the third interface board, the logical device is further to change the recorded state of the data packet buffer from occupied to idle, based on the release information of the data packet buffer.

6. The first interface board according to claim 1, wherein when determining the destination board of the first Ethernet data packet received from the Ethernet switch chip is the forwarding board of the network device, the logical device is further to encapsulate the first Ethernet data packet into a PCI-E packet, which takes the PCI-E memory space address of the system memory as the destination address, such that the PCI-E Endpoint forwards the PCI-E packet to the forwarding board, and the forwarding board is to write the PCI-E packet to the system memory of the forwarding board.

7. The first interface board according to claim 6, wherein the logical device is further to maintain a first mapping table, which is between an Ethernet MAC address and a board ID, so as to determine the destination board of the first Ethernet data packet, based on the destination MAC address of the first Ethernet data packet;

the logical device is further to create an entry corresponding to the forwarding board in the first mapping table, based on configurations of a central processing unit (CPU) when initializing the network device;

wherein the second PCI-E packet coming from the third interface board, which is obtained by the logical device from the board memory, is encapsulated with the second Ethernet data packet received by the third interface board from the exterior of the network device, and carries the board ID of the third interface board; and, the logical device is further to create an entry corresponding to the third interface board in the first mapping table, based on the source MAC address of the second Ethernet data packet parsed out from the second PCI-E packet and the board ID carried by the second PCI-E packet.

8. A network device, wherein, comprising a forwarding board and at least two interface boards, wherein the forwarding board comprises a central processing unit (CPU), a system memory, a system memory controller, a Peripheral Component Interconnect Express (PCI-E) root complex (RC) corresponding to each interface board, each interface board comprises an Ethernet switch chip, a logical device, a board memory, and a PCI-E Endpoint connected with a corresponding PCI-E RC in the forwarding board via a PCI-E bus;

the Ethernet switch chip of each interface board is to receive a first Ethernet data packet from an exterior of the network device;

the board memory of each interface board and the system memory of the forwarding board are mapped to PCI-E memory space of the network device, wherein address ranges in the PCI-E memory space mapped by the board memory of each interface board, and mapped by the system memory of the forwarding board are different;

the logical device of each interface board is to receive the first Ethernet data packet from the Ethernet switch chip of the interface board, and determine the destination board of the first Ethernet data packet; wherein when determining that the destination board of the first Ethernet data packet received from the Ethernet switch chip is a second interface board of the network device, the logical device is to encapsulate the first Ethernet data packet to a first PCI-E packet, which takes a PCI-E memory space address of a board memory of the second interface board as the destination address, such that the PCI-E Endpoint of the interface board forwards the first PCI-E packet to the PCI-E RC corresponding to the forwarding board, and enables the PCI-E RC corresponding to the forwarding board to forward the first PCI-E packet to the board memory of the destination board, based on the destination address of the first PCI-E packet;

the logical device of each interface board is further to obtain from the board memory of the interface board a second PCI-E packet coming from a third interface board, parse out a second Ethernet data packet from the obtained second PCI-E packet, and transmit the second Ethernet data packet to the Ethernet switch chip of the interface board, wherein the third interface board is the same as, or is different from the second interface board.

9. The network device according to claim 8, wherein when determining the destination board of the first Ethernet data packet received from the Ethernet switch chip is the forwarding board, the logical device of each interface board is to encapsulate the first Ethernet data packet into a PCI-E packet, which takes the PCI-E memory space address of the system memory as the destination address, such that the PCI-E Endpoint forwards the PCI-E packet to the corresponding PCI-E RC in the forwarding board, and the corresponding PCI-E RC in the forwarding board writes the PCI-E packet to the system memory of the forwarding board.

10. The network device according to claim 9, wherein the logical device of each interface board is to maintain a first mapping table, which is between an Ethernet media access control (MAC) address and a board ID, so as to determine the destination board of the first Ethernet data packet, based on the destination MAC address of the first Ethernet data packet;

wherein the logical device of each interface board is to create an entry corresponding to the forwarding board in the first mapping table, based on configurations of the CPU when initializing the network device;

wherein the second PCI-E packet coming from the third interface board, which is obtained by the logical device of each interface board from the board memory of the interface board, is encapsulated with the second Ethernet data packet received by the third interface board from the exterior of the network device, and carries the board ID of the third interface board;

the logical device of each interface board is further to create an entry corresponding to the third interface board in the first mapping table, based on the source MAC address of the second Ethernet data packet parsed out from the second PCI-E packet and the board ID carried by the second PCI-E packet.

11. The network device according to claim 8, wherein the logical device of each interface board is further to maintain a second mapping table, which is between a board ID and a PCI-E memory space address, so as to determine the destination address of the first PCI-E packet encapsulated with the first Ethernet data packet, based on the destination board of the first Ethernet data packet received from the Ethernet switch chip; and, the logical device of each interface board is further to create entries corresponding to the forwarding board and the other interface boards in the second mapping table, based on configurations of the CPU when initializing the network device.

12. A method for forwarding a packet, which is applied to a network device, wherein the network device comprises a forwarding board and at least two interface boards, each interface board comprises a Peripheral Component Interconnect Express (PCI-E) Endpoint, an Ethernet switch chip, and a board memory; the board memory of each interface board, and a system memory of the forwarding board are mapped to PCI-E memory space of the network device, address ranges in the PCI-E memory space mapped by the board memory of each interface board, and mapped by the system memory of the forwarding board are different;

wherein the method is applied to any interface board, comprising:

when receiving a first Ethernet data packet by the Ethernet switch chip from an exterior of the network device, determining a destination board of the first Ethernet data packet;

after determining that the destination board of the first Ethernet data packet received from the Ethernet switch chip is a second interface board of the network device, encapsulating the first Ethernet data packet into a first PCI-E packet, which takes a PCI-E memory space address of the board memory of the second interface board as a destination address, such that the PCI-E Endpoint forwards the first PCI-E packet to the forwarding board, and enables the forwarding board to forward the first PCI-E packet to the board memory of the destination board, based on the destination address of the first PCI-E packet;

when obtaining from the board memory a second PCI-E packet coming from a third interface board, parsing out a second Ethernet data packet from the obtained second PCI-E packet, and forwarding the second Ethernet data packet to the Ethernet switch chip.

13. The method according to claim 12, wherein, the method further comprising:

maintaining a first mapping table between an Ethernet media access control (MAC) address and a board ID, so as to determine the destination board of the first Ethernet data packet, based on the destination MAC address of the first Ethernet data packet;

parsing out the second Ethernet data packet, and the board ID of the third interface board from the second PCI-E packet coming from the third interface board; wherein the second Ethernet data packet is received by the third interface board from the exterior of the network device;

creating an entry corresponding to the third interface board in the first mapping table, based on the source MAC address of the second Ethernet data packet and the board ID carried by the second PCI-E packet.

14. The method according to claim 12, wherein, the method further comprising:

maintaining a second mapping table between a board ID and a PCI-E memory space address, so as to determine the destination address of the first PCI-E packet encapsulated with the first Ethernet data packet, based on the destination board of the first Ethernet data packet received from the Ethernet switch chip, and create an entry in the second mapping table, based on configurations of a central processing unit (CPU) in the forwarding board.

15. The method according to claim 12, wherein, the method further comprising:
when it fails to determine the destination board of the first Ethernet data packet received from the Ethernet switch chip, encapsulating the first Ethernet data packet into more than one PCI-E packets, which take a PCI-E memory space address of a board memory of each remaining interface board in the network device as the destination address, such that the PCI-E Endpoint forwards the more than one PCI-E packets to the forwarding board, and enables the forwarding board to forward the more than one PCI-E packets to corresponding remaining interface boards, based on the destination addresses of the more than one PCI-E packets.

* * * * *